US012751798B2

(12) United States Patent
Ismael

(10) Patent No.: US 12,751,798 B2
(45) Date of Patent: Oct. 6, 2026

(54) DENTAL ARCH POSITIONING SETUP

(71) Applicant: EXOCAD GMBH, Darmstadt (DE)

(72) Inventor: Gustavo Ismael, Sao Paulo (BR)

(73) Assignee: EXOCAD GMBH, Darmstadt (DE)

( * ) Notice: Subject to any disclaimer, the term of this patent is extended or adjusted under 35 U.S.C. 154(b) by 147 days.

(21) Appl. No.: 18/764,682

(22) Filed: Jul. 5, 2024

(65) Prior Publication Data

US 2026/0007493 A1 Jan. 8, 2026

(51) Int. Cl.
*A61C 8/00* (2006.01)
*A61C 13/00* (2006.01)

(52) U.S. Cl.
CPC .......... *A61C 8/0066* (2013.01); *A61C 8/0095* (2013.01); *A61C 13/0004* (2013.01)

(58) Field of Classification Search
None
See application file for complete search history.

(56) References Cited

U.S. PATENT DOCUMENTS

2014/0099600 A1* 4/2014 Harrison .............. A61C 8/0006 433/173
2014/0272779 A1* 9/2014 Okay ................... A61C 9/0053 433/173
2014/0272797 A1* 9/2014 Prestipino ............ A61C 8/0048 433/199.1
2016/0000536 A1* 1/2016 Grobbee ................ H03H 9/215 433/173
2016/0374778 A1* 12/2016 Grobbee ................ A61C 13/01 433/74
2019/0298494 A1* 10/2019 Webber .................. A61C 7/002
2020/0397540 A1* 12/2020 De Clerck ........... A61C 9/0053
2021/0045853 A1* 2/2021 Choi .................. A61C 13/0004

* cited by examiner

*Primary Examiner* — Heidi M Eide
(74) *Attorney, Agent, or Firm* — PERRY + CURRIER INC.

(57) ABSTRACT

The invention relates to a dental arch positioning setup comprising a full dental arch with a gingiva section and a support base. The support base is configured to support and position the full dental arch with the gingiva section on a patient's edentulous jaw. An occlusal surface of the support base comprises a cutout for the full dental arch with the gingiva section. The cutout has a cross-section larger than a cross-section of the full dental arch with the gingiva section. A plurality of connecting elements holds the full dental arch with the gingiva section in position over the cutout.

18 Claims, 17 Drawing Sheets

DENTAL ARCH POSITIONING SETUP

FIELD OF THE INVENTION

The invention relates to the field of dental technology, in particular to a dental arch positioning setup.

BACKGROUND

An implant-based full dental bridge is a dental bridge comprising a full dental arch of artificial teeth configured to be fastened to implants inserted into a patient's toothless jaw. An implant-based full dental arch may be fastened to the implants via abutments, which are configured to be received by the implants and fastened to the same, e.g., using screws.

When setting implants for such an implant-based full dental arch in a patient's edentulous jaw, the final positions of the implants may not be precisely predictable. The final positions may, e.g., deviate from planned positions. This is true for a freehand setting of the implants as well as for a guided surgery using a drill guide for setting the implants, since even using a drill guide, the final positions of the implants may comprise slight deviations of 2 to 4 mm.

Without knowing the precise final positions of the implants in advance, the abutments may have to be added to the bridge only after the setting of the implants, when the precise final positions of the implants can be determined.

Thus, there is a need for an efficient and precise approach enabling a positioning of abutments of a full dental arch.

SUMMARY

It is an objective to provide for a dental arch positioning setup, a computer program product comprising manufacturing data defining a first three-dimensional digital model of a dental arch positioning setup as a template for manufacturing the dental arch positioning setup, and a computing device comprising a memory storing manufacturing data defining a three-dimensional digital model of a dental arch positioning setup as a template for manufacturing the dental arch positioning setup.

In one aspect, the invention relates to a dental arch positioning setup comprising a full dental arch with a gingiva section and a support base. The support base is configured to support and position the full dental arch with the gingiva section on a patient's edentulous first jaw. An occlusal surface of the support base comprises a cutout for the full dental arch with the gingiva section. The cutout has a cross-section larger than a cross-section of the full dental arch with the gingiva section. A plurality of connecting elements connect the full dental arch and gingiva section with the support base. The plurality of connecting elements holds the full dental arch with the gingiva section in position over the cutout. The full dental arch further comprises a plurality of through-holes extending through the full dental arch with the gingiva section. The through-holes are configured to receive abutments for attaching the full dental arch with the gingiva section to implants.

Examples may enable an efficient and precise positioning of the full dental arch relative to implants placed in a patient's jaw for adding abutments. Examples may enable an efficient and precise adding of abutments aligned implants placed in the patient's jaw for adding abutments. Thus, forming an implant-based bridge comprising a full dental arch with a gingiva section and abutments may be enabled.

The dental arch positioning setup provides a full dental arch, which may be used for forming an implant-based full dental arch. The full dental arch may comprise a complete set of artificial teeth of a complete dental arch, i.e., four incisors, two canines, four premolars and six molars. The dental arch positioning setup may be used for positioning the full dental arch with the gingiva section over implants arranged within a patient's jawbone, such that abutments on the implants are arranged within the through-holes extending through the full dental arch with the gingiva section. For example, the full dental arch with the gingiva section may be supported on a patient's edentulous jaw using the support base comprised by the dental arch positioning setup. These through-holes may be configured for receiving the abutments for attaching the full dental arch with the gingiva section to the implants. The abutments may be arranged on the implants, such that they extend into the through-holes. The abutments received in the through-holes may, e.g., be bonded to the full dental arch using a bonding agent. The though-holes may have cross-sections extending perpendicular to length axes of the through-holes, which are larger than cross-sections of the abutments extending perpendicular to length axes of the abutments. Thus, slight deviations of positions of the abutments from a center of the through-holes may be compensated by the larger cross-sections of the through-holes. Despite these deviations, it may still be possible to arrange the abutments on the implants within the through-holes.

For example, the dental arch positioning setup may be provided with the full dental arch and gingiva section comprising the through-holes. The dental arch positioning setup may, e.g., be manufactured with the full dental arch and gingiva section comprising the through-holes. The through-holes may, e.g., be positioned such that they are aligned with planned positions of the implants, when the dental arch positioning setup is arranged on the patient's jaw.

For example, the dental arch positioning setup may be provided with the full dental arch and gingiva section comprising no through-holes. The dental arch positioning setup may, e.g., be manufactured with the full dental arch and gingiva section comprising no through-holes. The through-holes may, e.g., be drilled into the dental arch positioning setup after the implants have been set using the actual position of the implants placed in the patient's jaw as reference positions for the through-holes, such that the through-holes are aligned with the actual positions of the implants, when the dental arch positioning setup is arranged on the patient's jaw.

When the implants are set, abutments may be arranged on the implants and may have to be bonded to the full dental arch with gingiva section. This full dental arch with the gingiva section or implant-based bridge may, e.g., be a provisional implant-based bridge. Examples may be able to facilitate the bonding of the abutments to the full dental arch with the gingiva section or implant-based bridge. The support base may enable a positioning of the full dental arch with the gingiva section over implants, even though there are no reference structures in a toothless jaw, where the full dental arch may be stabilized for the bonding.

With a cross-section of the cutout being larger than a cross-section of the full dental arch with the gingiva section, the support base may be removable after detaching the full dental arch and gingiva section from the connecting elements, while the full dental arch and gingiva section may remain mounted onto the patient's jaw via the bonded abutments. The cross-section of the cutout may be a cross-section in a plane parallel to an occlusal plane of the full dental arch.

When the implants are set, abutments may be arranged on the implants, which have to be bonded to a dental bridge, e.g., a provisional bridge. This bridge may be provided in form of the full dental arch with the gingiva section. Providing the full dental arch with the gingiva section as part of a dental arch positioning setup may facilitate the step of bonding the abutments to the full dental arch. The full dental arch with the gingiva section may be supported and its position stabilized by the support base. Thus, the full dental arch with the gingiva section may be stabilized for the bonding even on an edentulous jaw.

The cutout having a cross-section larger than a cross-section of the full dental arch with the gingiva section, may have boundaries extending along one or more sides of the gingiva section. For example, the cutout may provide a clearance between the gingiva section and the support base extending around the full dental arch with the gingiva section framing the same. The connecting elements may bridge over the cutout and hold the full dental arch with the gingiva section in position over the cutout. Via lateral openings in the dental arch positioning setup provided by the clearance between the gingiva section and the support base a bonding agent inserted into the through-holes to bond the abutments to the full dental arch with the gingiva section may be cooled and/or cured, e.g., light cured.

The bonding agent may, e.g., be a thermal composite or a light-cured composite resin, configured to bond the abutments to the full dental arch with the gingiva section forming a dental bridge. The cutout around may enable a cooling of the bonding agent, e.g., in case of a thermal composite, and/or an applying of light to the bonding agent, e.g., in case of a light-cured composite resin.

In case of a thermal composite that polymerizes by mixing a powder and a liquid, a cooling may be required, in order to prevent inconveniences for the patient. In particular any burning of the patient's mucosa is to be prevented. For cooling the bonding agent a coolant, e.g., cool water, may be sprayed onto the bonding agent via the clearance provided by the cutout. In case of a light-cured composite resin, providing light may be required for curing the bonding agent. For curing the bonding agent, e.g., light may be emitted onto the bonding agent via the clearance provided by the cutout.

After the abutments have been bonded to the full dental arch with the gingiva section, the connecting elements may be disconnected from the full dental arch with the gingiva. The resulting full dental arch with the gingiva and the abutments may, e.g., form an implant-based dental bridge. The bridge may, e.g., be a provisional bridge. Such a provisional bridge may, e.g., be used as a template for a final bridge. For example, the provisional bridge may be scanned, e.g., using an optical scan, and the resulting scan data may be used for generating a three-dimensional digital model of the provisional bridge with the abutments bonded to the same. This three-dimensional digital model may be used as a template for manufacturing the final bridge. The final bridge may, e.g., be manufactured using methods of rapid prototyping, like 3D printing or milling. For example, the final bridge may be mounted onto the implants using an implant-based dental bar. For example, the positions of the abutments defined by the three-dimensional digital model of the provisional bridge may be used for defining a three-dimensional digital model of the dental bar.

Examples may, e.g., provide an immediate implant load prosthesis, i.e., a prothesis, which may be used for an immediate implant loading. The immediate implant load prosthesis may be screwed to the patient month directly after the implant surgery. The fixation of the screw channel to the prosthesis, i.e. the bonding of the abutments the immediate implant load prosthesis provided by the full dental arch with the gingiva section, may be established within the patient's mouth. Examples may, e.g., provide an immediate implant load bridge, i.e., a bridge, which may be used for an immediate implant loading.

Immediate implant loading refers to an immediate functional occlusal loading of an implant after its insertion, e.g., within 48 hours of its insertion. In contrast to conventional loading, immediate implant loading may reduce the waiting period between implant insertion and loading considerably, as well as the number of visits to the dentist. The immediate implant loading approach is based on an initial primary stability of the implants and thus of the bridge being provided in the old bone, which will change over time into a secondary stability in new and osseointegrated bone. During this period of change into the secondary stability or at least at the beginning of this period, e.g., the immediate implant load bridge may be used as provisional bridge, which is later replaced by a final bridge.

Further, the dental arch positioning setup may be configured as a multi-functional setup. The dental arch positioning setup may, e.g., first be used as a surgery guide and/or a drilling guide. For example, the full dental arch with gingiva section comprised by the dental arch positioning setup may be provided in a two-part form comprising a vestibular part and an oral part. The oral part may, e.g., comprise an occlusal surface of the full dental arch. The oral part may, e.g., comprise occlusal surfaces of teeth of the full dental arch. With the oral part removed, the cutout provided by the support base of the dental arch positioning setup may provide a sufficiently large clearance for using the dental arch positioning setup as a surgery guide and/or a drilling guide. After that, the dental arch positioning setup may be used for positioning the full dental arch with the gingiva section relative to the implants inserted into the holes drilled before, e.g., using the dental arch positioning setup as a drilling guide, and stabilizing the full dental arch with the gingiva section, while bonding the abutments arranged on the implants to the full dental arch. For example, an immediate implant load bridge may thus be provided by the full dental arch with the gingiva section and the added abutments.

The immediate implant load bridge is, e.g., a provisional implant-based bridge. It may, e.g., not be attached to any bar, but rather attached to the individual implants via individual abutments, which are bonded to the full dental arch using a bonding agent. After the bonding has been established, the patient may, e.g., open the mouth, the prosthesis, i.e., the immediate implant load bridge, may be unscrewed from the implants in the patient's mouth and be finalized.

For example, the full dental arch with the gingiva section is one structure forming a single body. For example, the full dental arch with the gingiva section may be monochromatic. For example, the full dental arch and the gingiva section may be two or more structures forming two or more bodies, which are bonded to each other using a bonding agent. For example, the full dental arch and the gingiva section may be two structures forming two bodies, which are bonded to each other. For example, the full dental arch and the gingiva section may have different colors. For example, the gingiva section may be gingiva-colored or gum-colored, while the full dental arch, i.e., a tooth section, may be tooth-colored.

For example, the dental arch positioning setup further comprises the abutments. The abutments may, e.g., be provided together with the dental arch positioning setup for a bonding to the full dental arch with the gingiva section. For example, the abutments of the dental arch positioning setup may be arranged within the through-holes of the full dental arch and bonded to the full dental arch using a bonding agent. The bonding may result in a dental arch positioning setup comprising a full dental arch with gingiva section and abutments.

For example, the abutments are bonded to the full dental arch with a first bonding agent arranged within the through-holes of the full dental arch. For bonding the abutments to the full dental arch, the abutments may be arranged on the implants placed in the patient's jaw. The dental arch positioning setup may be arranged on the patient's jaw with the abutments being placed within the through-holes of the full dental arch. The full dental arch with the gingiva section may be held in place and stabilized relative to the abutments and implants by the support base. With the full dental arch being stabilized, the first bonding agent arranged within the through-holes and cured.

For example, the cutout provides a clearance between the gingiva section and the support base bridged by the connecting elements. The clearance provides access to gingival ends of the through-holes of the full dental arch. This access may allow for facilitating and/or promoting the curing of the bonding agent arranged within the through-holes. For example, a coolant, like cool water, may be supplied via this access to cool the bonding agent. For example, light may be applied to the bonding agent via this access to cur a light-cured bonding agent.

The clearance may, e.g., provide access to the gingival ends of the through-holes of the full dental arch from a vestibular side of the full dental arch. The clearance may, e.g., provide access to the gingival ends of the through-holes of the full dental arch from an oral side of the full dental arch. The clearance may, e.g., even provides access to the gingival ends of the through-holes of the full dental arch from distal ends of the full dental arch.

For example, the clearance extends along a vestibular side of the dental arch positioning setup providing access to the gingival ends of the through-holes of the full dental arch from the vestibular side. For example, the clearance extends along an oral side of the dental arch positioning setup providing access to the gingival ends of the through-holes of the full dental arch from the oral side.

Examples may have the beneficial effect that access to the gingival ends of the through-holes of the full dental arch may be provided from multiple sides of the full dental arch, i.e., directions. Thus, a coolant may, e.g., be applied from multiple direction. This may, e.g., increase a cooling effect of the coolant being applied. For example, light may be applied from multiple direction. This may, e.g., increase a curing effect of the light being applied.

For example, the clearance extends circumferentially around the full dental arch with the gingiva section. A clearance extending circumferentially around the full dental arch with the gingiva section may, e.g., provide access to the gingival ends of the through-holes from all sides of the full dental arch.

For example, the connecting elements are provided in form of connecting pins. Using connecting pins may limit and/or avoid interferences of the connecting elements with the access to the gingival ends of the through-holes of the full dental arch via the clearance, which is bridged by the connecting pins.

For example, the connecting elements comprise pre-determined breaking sections configured to enable a detaching of the full dental arch with the gingiva section from the support base by a breaking of the connecting elements at the pre-determined breaking sections.

The pre-determined breaking sections may facilitate a detaching of the full dental arch with the gingiva section from the support base, e.g., by facilitating a breaking and/or cutting of the connecting elements at the pre-determined breaking sections. The pre-determined breaking sections may, e.g., be sections of the connecting elements with a reduced material thickness, e.g., with a reduced diameter.

For example, the pre-determined breaking sections are provided by end sections of the connecting elements. The end sections are connected to the gingiva section and tapering towards the gingiva section.

A tapering of the pre-determined breaking sections towards the gingiva section may result in a reduced diameter and thus material thickness of the connecting elements at the gingiva section, facilitating detaching of the connecting elements from the gingiva section. This detaching may, e.g., comprise a breaking and/or cutting of the connecting elements at the gingiva section.

For example, the end sections have conical forms. The end sections with their conical forms may, e.g., form cone attachment tips with only small contact cross-sections to the dental arch and gingiva section, e.g., to the gingiva section, for enabling an easy detaching of the dental arch and gingiva section from the connecting elements and thus from the support base. This detaching may, e.g., comprise a breaking and/or cutting of the connecting elements at the gingiva section.

For example, the full dental arch with the gingiva section is provided in a two-part form comprising a vestibular part and an oral part. The vestibular part comprises a vestibular tooth subpart and a vestibular gingiva subpart. The oral part comprises an oral tooth subpart and an oral gingiva subpart. The oral tooth subpart may, e.g., comprise occlusal surfaces of teeth of the full dental arch.

Providing the full dental arch with the gingiva section provided in a two-part form may have the beneficial effect that the dental arch positioning setup may be usable as a multi-purpose setup. With the oral part removed from the dental arch positioning setup, the cutout may be accessible from an occlusal side. The cutout provided by the support base of the dental arch positioning setup may provide a sufficiently large clearance for using the dental arch positioning setup as a surgery guide and/or a drilling guide, when the oral part is removed. The dental arch positioning setup with the oral part removed may thus be used as a surgery guide and/or drill guide. The dental arch positioning setup may be used as an indicator and/or reference, to which extend natural material, e.g., bone material of the jaw may have to be removed before setting the implants. A lower rim of the cutout may, e.g., define a bone reduction level, such that the dental arch positioning setup may also be used as a surgery guide for a bone reduction. The dental arch positioning setup may be used as an indicator and/or reference, where to set the implants and thus where to drill holes into the jawbone for receiving implants.

Thus, the dental arch positioning setup with the oral part removed may be used as a guide for preparing a mandible or a maxilla of a patient for receiving implants. After jaw has been prepared, i.e., the jawbone having been reduced and/or the implant holes having been drilled, implants may be inserted into the holes. With the oral part removed, the implants may be set, e.g., while the dental arch positioning setup is still arranged on the patient's jaw.

Adding the oral part to the vestibular part, the full dental arch may be formed. The vestibular part and the oral part of the full dental arch with the gingiva section may be bonded to each other using a second bonding agent. The second bonding agent may, e.g., be the same as the first bonding agent used for the abutments or a different bonding agent. After the oral part having been added, the abutments arranged within the through-holes provided, at least partially, by the oral part may be bonded to the full denture arch with the first bonding agent. The full dental arch, resulting from adding the oral part, may than, e.g., be used as a provisional implant-based bridge and/or immediate implant load bridge. The through-holes for receiving abutments may be pre-defined within the full dental arch or may be drilled into the full dental arch after the vestibular part and the oral part have been connected with each other.

The dental arch positioning setup may be arranged on a patient's jaw, e.g. a maxilla or mandible, such that abutments arranged on the implants are arranged within the through holes. The abutments may be bonded to the full dental arch using bonding agent arranged within the through-holes of the full dental arch. After the full dental arch with the gingiva section has been bonded to the abutments, the full dental arch with the gingiva section may be removed from the support base together with the abutments by detaching the connection between the connecting elements and the full dental arch with the gingiva section. Thus, a final implant-based bridge may be provided. This final implant-based bridge may, e.g., be formed by the full dental arch with the gingiva section and the abutments.

For example, the vestibular part and the oral part of the full dental arch with the gingiva section are bonded to each other by a second bonding agent. This second bonding agent may, e.g., be a different second bonding agent different from the first bonding agent used for bonding the abutments within the trough-holes. This second bonding agent may, e.g., be the same bonding agent as the first bonding agent used for bonding the abutments within the trough-holes, i.e., first and second bonding agent may be same in this case.

For example, only the vestibular part of the full dental arch with the gingiva section is connected to the support base via the connecting elements. Thus, the oral part may be provided as a part detached from the rest of the dental arch positioning setup. The rest of the dental arch positioning setup, i.e., the dental arch positioning setup with the oral part removed may, e.g., be used as a guiding element for guiding a preparation of the jaw for the implants, like a surgery and/or a drilling of implant hole. After the jaw has been prepared and/or the implants have been placed within the jaw, the oral part may be attached, e.g., bonded, to the vestibular part and thus to the rest of the dental arch positioning setup. According to an alternative example, e.g., only the oral part of the full dental arch with the gingiva section is connected to the support base via the connecting elements.

In another aspect, the invention relates to an assembly comprising the dental arch positioning setup of any of the aforementioned examples of a dental arch positioning setup and a bite index. The bite index comprises a reception section with a reception for receiving the full dental arch of the dental arch positioning setup and one or more spacing elements configured to establish a pre-defined spacing between the dental arch positioning setup and the patient's second jaw.

The bite index may thus be configured for arranging the dental arch positioning setup on the first jaw at a pre-predefined position relative to the second jaw. The spacing elements of the bite index may, e.g., support the dental arch positioning setup in a pre-defined position relative to the patient's second jaw on the patient's first jaw. This pre-defined position may, e.g., be a pre-defined occlusion. The spacing elements may further be configured for providing clearances between each other allowing access to the patient's oral cavity and especially to an oral section of the cutout of the dental arch positioning setup, when the patient bits on the dental arch positioning setup arranged within the bite index. Thus, a bonding agent inserted into the through-holes, in order to bond the abutments to the full dental arch with the gingiva section, may be cooled and/or provided with light also via the oral section of the cutout of the dental arch positioning setup. This may be enabled by the design of the bite index, even when the patient bites on the dental arch positioning setup arranged within the bite index.

For cooling the bonding agent a coolant, e.g., cool water may have to be sprayed onto the bonding agent, which may be challenging, when the patient has to keep the mouth closed, e.g., in order to maintain a correct occlusion. Using the bite index, the correct occlusion may be maintained, while still providing access to the patient's oral cavity. For curing the bonding agent, e.g., light may have to be applied to the bonding agent, which may be challenging, when the patient has to keep the mouth closed, e.g., in order to maintain a correct occlusion. Using the bite index, the correct occlusion may be maintained, while still providing access to the patient's oral cavity.

Using a bite index may further have the beneficial effect of required less clinical hand-milling and adaptation of the prosthesis, since the bite index enables an execution of the bonding at an opened patient mouth. The opened patient mouth with the bite index provides, e.g., access to the through-holes. Access may, e.g., be provided directly to occlusal ends of the through-holes and/or indirectly to gingival ends of the through-holes via the cutout of the dental arch positioning setup.

For example, the spacing elements are arranged on an occlusal surface of the bite index, i.e. of the reception section. The spacing elements may extend from the occlusal surface of the bite index in occlusal direction. For example, the spacing elements may be configured to support themselves on the opposite jaw of the patient. For example, the spacing elements may extend between two reception sections comprised by the bite index. In this case, the spacing elements may, e.g., extend between occlusal surfaces of the reception sections.

For example, the one or more spacing elements comprise one or more pillars. The pillars may provide one or more clearances between each other through which an access to the oral cavity of the patient is provide, even in case the bite index is arranged in the patient's mouth.

For example, the occlusal surface of the reception section of the bite index comprises one or more cutouts configured for providing access to the plurality of through-holes comprised by the full dental arch, when the full dental arch is arranged within the reception of the reception section. The cutouts may be cutouts in the occlusal surface of the of the reception section of the bite index. The cutouts may be aligned with the through-holes, i.e., with the occlusal ends of the through-holes, such that the occlusal ends of the through-holes are exposed by the cutout. Thus, an access may be provided to the occlusal ends of the through-holes via the cutouts in the bite index, i.e., in the reception section, even in case the bite index is arranged within the patient's mouth.

For example, the assembly further comprises a second dental arch positioning setup for the patient's second jaw. The bite index further comprises a second reception section with a second reception for receiving a second full dental arch of the second dental arch positioning setup. The spacing elements of the bite index connect the two reception sections of the bite index with each.

The bite index may, e.g., be configured for arranging two dental arch positioning setups on opposite jaws of a patient. The bite index may comprise two reception sections for two dental arch positioning setups. The reception sections may be connected via the spacing elements. The spacing elements may be configured to hold the dental arch positioning setups via the reception sections in pre-defined position relative to each other on the jaws of the patient, while the patient bites on the bite index.

In another aspect, the invention relates to a computer program product comprising a non-transitory computer readable storage medium. The non-transitory computer readable storage medium comprises manufacturing data embodied therewith. The manufacturing data defines a first three-dimensional digital model of a dental arch positioning setup as a first template for manufacturing the dental arch positioning setup. The dental arch positioning setup comprises a full dental arch with a gingiva section and a support base. The support base is configured to support and position the full dental arch with the gingiva section on a patient's edentulous first jaw. An occlusal surface of the support base comprises a cutout for the full dental arch with the gingiva section. The cutout has a cross-section larger than a cross-section of the full dental arch with the gingiva section. A plurality of connecting elements connects the full dental arch and gingiva section with the support base. The plurality of connecting elements holds the full dental arch with the gingiva section in position over the cutout. The full dental arch comprises a plurality of through-holes extending through the full dental arch with the gingiva section. The through-holes are configured to receive abutments for attaching the full dental arch with the gingiva section to implants.

The manufacturing data provided by the computer program product may, e.g., define any of the aforementioned examples of the three-dimensional digital model of the dental arch positioning setup as a template for manufacturing the dental arch positioning setup.

For example, the non-transitory computer readable storage medium further comprises program instructions embodied therewith, which are executable by a processing unit of a computing device. Execution of the program instructions by the processing unit may causes the computing device to provide the manufacturing data for controlling a manufacturing of the dental arch positioning setup. Execution of the program instructions by the processing unit may causes the computing device to control a manufacturing of the dental arch positioning setup using the manufacturing data.

The three-dimensional digital model of the dental arch positioning setup may be generated using a three-dimensional digital tissue model of intraoral tissue of the patient. The three-dimensional digital tissue model may comprise one or two three-dimensional digital models of one or two jaws of a patient. The jaws may, e.g., be edentulous shows. This three-dimensional digital tissue model may, e.g., be generated using scan data of the intraoral tissue. The scan data of the intraoral tissue may, e.g., comprise optical scan data. The optical scan data may, e.g., comprise intraoral optical scan data or optical scan data from an optical scan of a classical mold/impression of the intraoral tissue. The optical scan data may, e.g., provide information about the surface structure of the patient's intraoral tissue comprising the gingiva.

The three-dimensional digital model of the dental arch positioning setup may be adjusted to the three-dimensional digital tissue model. For example, a gingival surface of the support base of the dental arch positioning setup may be adjusted to a surface of the three-dimensional digital tissue model, on which the support base is to be arranged. For example, the full dental arch may be generated using a plurality of three-dimensional digital tooth models of artificial teeth. For providing the three-dimensional digital tooth models of the artificial teeth, e.g., library teeth may be used. For example, scans of natural teeth may be used for providing the three-dimensional digital tooth models of the artificial teeth. For example, the three-dimensional digital tooth models of the artificial teeth may be generated from scratch. For example, planned positions of the implants to be set may be used for determining positions of the through-holes within the dental arch positioning setup.

For example, the manufacturing data further defines a second three-dimensional digital model of a bite index as a second template for manufacturing the bite index. The bite index comprises a reception section with a reception for receiving the full dental arch of the dental arch positioning setup and one or more spacing elements configured to establish a pre-defined spacing between the dental arch positioning setup and the patient's second jaw, when dental arch positioning setup is arranged on the patient's edentulous first jaw.

The manufacturing data provided by the computer program product may, e.g., further define any of the aforementioned examples of the three-dimensional digital model of the bite index as a template for manufacturing the bite index.

For example, the non-transitory computer readable storage medium further comprises program instructions embodied therewith, which are executable by a processing unit of a computing device. Execution of the program instructions by the processing unit may causes the computing device to provide the manufacturing data for controlling a manufacturing of the bite index. Execution of the program instructions by the processing unit may causes the computing device to control a manufacturing of the bite index using the manufacturing data.

The three-dimensional digital model of the bite index may be generated using the three-dimensional digital model of the dental arch positioning setup and a three-dimensional digital tissue model of intraoral tissue of the patient.

In another aspect, the invention relates to a computer program comprising manufacturing data. The manufacturing data defines a first three-dimensional digital model of a dental arch positioning setup as a first template for manufacturing the dental arch positioning setup. The dental arch positioning setup comprises a full dental arch with a gingiva section and a support base. The support base is configured to support and position the full dental arch with the gingiva section on a patient's edentulous first jaw. An occlusal surface of the support base comprises a cutout for the full dental arch with the gingiva section. The cutout has a cross-section larger than a cross-section of the full dental arch with the gingiva section. A plurality of connecting elements connects the full dental arch and gingiva section with the support base. The plurality of connecting elements holds the full dental arch with the gingiva section in position over the cutout. The full dental arch comprises a plurality of through-holes extending through the full dental arch with the gingiva section. The through-holes are configured to receive abutments for attaching the full dental arch with the gingiva section to implants.

The manufacturing data provided by the computer program may, e.g., define any of the aforementioned examples of the three-dimensional digital model of the dental arch positioning setup as a template for manufacturing the dental arch positioning setup.

For example, the computer program further comprises program instructions, which are executable by a processing unit of a computing device. Execution of the program instructions by the processing unit may causes the computing device to provide the manufacturing data for controlling a manufacturing of the dental arch positioning setup. Execution of the program instructions by the processing unit may causes the computing device to control a manufacturing of the dental arch positioning setup using the manufacturing data.

For example, the manufacturing data further defines a second three-dimensional digital model of a bite index as a second template for manufacturing the bite index. The bite index comprises a reception section with a reception for receiving the full dental arch of the dental arch positioning setup and one or more spacing elements configured to establish a pre-defined spacing between the dental arch positioning setup and the patient's second jaw, when dental arch positioning setup is arranged on the patient's edentulous first jaw.

The manufacturing data provided by the computer program may, e.g., further define any of the aforementioned examples of the three-dimensional digital model of the bite index as a template for manufacturing the bite index.

For example, the computer program further comprises program instructions, which are executable by a processing unit of a computing device. Execution of the program instructions by the processing unit may causes the computing device to provide the manufacturing data for controlling a manufacturing of the bite index. Execution of the program instructions by the processing unit may causes the computing device to control a manufacturing of the bite index using the manufacturing data.

In another aspect, the invention relates to a computing device comprising a processing unit and a memory storing program instructions executable by the processing unit. The memory further stores manufacturing data defining a first three-dimensional digital model of a dental arch positioning setup as a first template for manufacturing the dental arch positioning setup. The dental arch positioning setup comprises a full dental arch with a gingiva section and a support base. The support base is configured to support and position the full dental arch with the gingiva section on a patient's edentulous first jaw. An occlusal surface of the support base comprises a cutout for the full dental arch with the gingiva section. The cutout has a cross-section larger than a cross-section of the full dental arch with the gingiva section. A plurality of connecting elements connect the full dental arch and gingiva section with the support base. The plurality of connecting elements holds the full dental arch with the gingiva section in position over the cutout. The full dental arch comprises a plurality of through-holes extending through the full dental arch with the gingiva section. The through-holes are configured to receive abutments for attaching the full dental arch with the gingiva section to implants. Execution of the program instructions by the processing unit causes the computing device to provide the manufacturing data for a manufacturing of the dental arch positioning setup using the first three-dimensional digital model of the dental arch positioning setup as the first template for the manufacturing.

The manufacturing data provided by the computing device may, e.g., define any of the aforementioned examples of the three-dimensional digital model of the dental arch positioning setup as a template for manufacturing the dental arch positioning setup.

Execution of the program instructions by the processing unit may cause the computing device to control the manufacturing of the dental arch positioning setup using the first three-dimensional digital model of the dental arch positioning setup provided by the manufacturing data as the first template for the manufacturing.

For example, the manufacturing data further defines a second three-dimensional digital model of a bite index as a second template for manufacturing the bite index. The bite index comprises a reception section with a reception for receiving the full dental arch of the dental arch positioning setup and one or more spacing elements configured to establish a pre-defined spacing between the dental arch positioning setup and the patient's second jaw, when dental arch positioning setup is arranged on the patient's edentulous first jaw. Execution of the program instructions by the processing unit further causes the computing device to provide the manufacturing data for a manufacturing of the bite index using the second three-dimensional digital model of the bite index as the second template for the manufacturing.

The manufacturing data provided by the computer program may, e.g., further define any of the aforementioned examples of the three-dimensional digital model of the bite index as a template for manufacturing the bite index.

Execution of the program instructions by the processing unit may cause the computing device to control the manufacturing of the bite index using the first three-dimensional digital model of the bite index provided by the manufacturing data as the second template for the manufacturing.

For example, a manufacturing system comprising the computing device of any of the aforementioned examples of a computing device is provided. The manufacturing system further comprises one or more manufacturing devices configured to manufacture the dental arch positioning setup. Execution of the program instructions by the processing unit further causes the computing device to control the one or more manufacturing devices to manufacture the dental arch positioning setup using the first three-dimensional digital model of the dental arch positioning setup provided by the manufacturing data as the first template for the manufacturing.

The manufacturing system may, e.g., be configured to manufacture any of the aforementioned examples of the dental arch positioning setup using the three-dimensional digital model of the dental arch positioning setup provided by the manufacturing data as a template for the manufacturing of the dental arch positioning setup.

For example, the one or more manufacturing devices of the manufacturing system may comprise one or more of the following: a machining device, a 3D printing device.

The one or more manufacturing devices may be used for manufacturing the dental arch positioning setup using one or more of the following: machining, 3D printing, casting.

For example, the one or more manufacturing devices further are configured to manufacture the bite index. Execution of the program instructions by the processing unit further causes the computing device to control the one or more manufacturing devices to manufacture the bite index using the second three-dimensional digital model of the bite index provided by the manufacturing data as the second template for the manufacturing.

The manufacturing system may, e.g., further be configured to manufacture any of the aforementioned examples of the bite index using the three-dimensional digital model of the bite index provided by the manufacturing data as a template for the manufacturing of the bite index.

The one or more manufacturing devices may be used for manufacturing the bite index using one or more of the following: machining, 3D printing, casting.

The above-described examples and embodiments may be combined freely as long as the combinations are not mutually exclusive.

BRIEF DESCRIPTION OF THE DRAWINGS

In the following, examples are described in greater detail making reference to the drawings in which.

DETAILED DESCRIPTION

Figure 1:
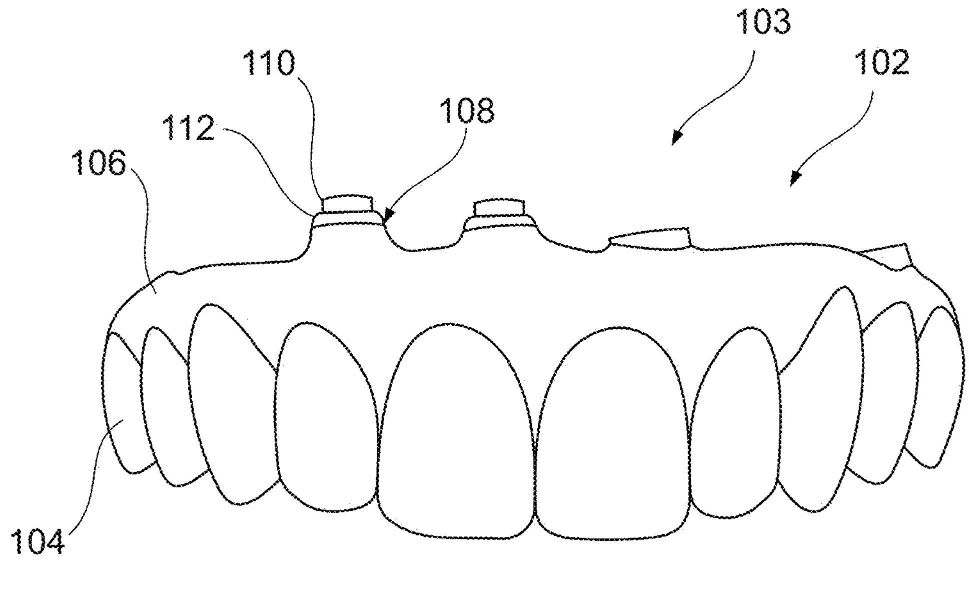
FIG. 1 shows an exemplary implant-based bridge in form of a full dental arch with gingiva section.

In the following, similar elements are denoted by the same reference numerals. Elements which have been discussed previously will not necessarily be discussed in later figures if the function is equivalent.

FIG. 1 shows an exemplary implant-based bridge 103 in form of a full dental arch 102 with a gingiva section 106. The view shown in FIG. 1 is a front view in oral direction onto the bridge 103. The full dental arch 102 comprises a plurality of artificial teeth 104 in form of a complete set of artificial teeth 104. The bridge 103 may, e.g., be an immediate implant load bridge, i.e., a bridge, which may be used for an immediate implant loading. Immediate implant loading refers to a placement of an implant-based prothesis, like the bridge 103, within a comparatively short after an implant placement, e.g., within 48 hours of implant placement. The bridge 103 is an implant-based bridge, i.e., it is configured to be retained at a patient's jaw using implants. For this purpose, the full dental arch 102 comprises a plurality of through-holes 108 extending through the full dental arch 102 with the gingiva section 106. Within these through-holes 108 abutments 110 are arranged. These abutments 110 are configured for attaching the full dental arch 102 with the gingiva section 106 to the implants. For example, the full dental arch 102 may be retained at the implants using fastening means, like screws, being arranged within the abutments 110 and fastening the abutments 110 with the full dental arch 102 to the implants.

The abutments 110 received in the through-holes 108 may, e.g., be bonded to the full dental arch 102 using a bonding agent 112. The though-holes 108 may have cross-sections extending perpendicular to length axes of the through-holes 108, which are larger than cross-sections of the abutments 110 extending perpendicular to length axes of the abutments. Thus, deviations of positions of the abutments 110 from a center of the through-holes 108, which may be required for aligning the abutments 110 with implants set in a patient's jaw, may be compensated using the larger cross-sections of the through-holes 108. Despite slight deviations of the implants from planned position within the patient's jaw, it may thus still be possible to arrange the abutments 110 fastened to the implants within the through-holes 108. When the implants are set, the abutments 110 may be arranged on the implants and may have to be bonded to the full dental arch 102. For this purpose, the full dental arch 102 may be arranged on a patient's jaw using the dental arch positioning setup described herein, such that the abutments 110 are arranged within the through-holes 108, and the abutments 110 arranged within the through-holes 108 may be bonded to the full dental arch 102 using a bonding agent 112. Thus, the abutments 110 may be fixated in position precisely aligned with the set implants, even in case slight deviations of the exact final positions of the implants may occur relative to planned positions of the implants, when placing the implants. For example, the through-holes 108 are arranged within the full dental arch 102, such that they are aligned with the planned positions of the implants, when the full dental arch 102 is arranged on the patient's jaw at a pre-defined position. For example, the through-holes 108 are arranged within the full dental arch 102 after the implants have been set, such that they are aligned with the actual positions of the implants, when the full dental arch 102 is arranged on the patient's jaw at a pre-defined position.

Figure 2:
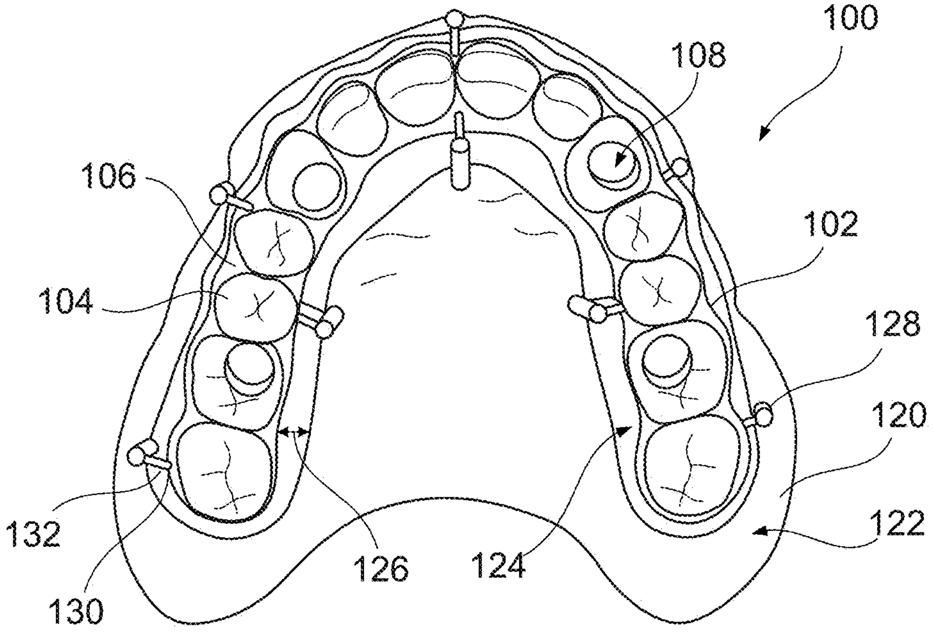
FIG. 2 shows an exemplary dental arch positioning setup.

FIG. 2 shows an exemplary dental arch positioning setup 100. The view shown in FIG. 2 is a view from above onto an upper, i.e., occlusal side of the dental arch positioning setup 100. The dental arch positioning setup 100 is, e.g., configured for positioning a full dental arch 102 at a pre-defined position relative to a patient's jaw. In particular, the dental arch positioning setup 100 may, e.g., be configured for positioning a full dental arch 102 at a pre-defined position relative to implants placed in the patient's jaw. For this purpose, the dental arch positioning setup 100 comprises the full dental arch 102 with a gingiva section 106 and a support base 120. The full dental arch 102 comprises a plurality of artificial teeth 104 in form of a complete set of artificial teeth 104. The full dental arch 102 with the gingiva section 106 may, e.g., form a bridge. For example, the full dental arch 102 may, e.g., form an immediate implant load bridge, which is configured for an immediate implant loading. Immediate implant loading refers to a placement of an implant-based prothesis, like the artificial teeth 104 with the gingiva section 106, within a comparatively short after an implant placement, e.g., within 48 hours of implant placement. The full dental arch 102 further comprises a plurality of through-holes 108 extending through the full dental arch 102 with the gingiva section 106. The through-holes 108 are configured to receive abutments for attaching the full dental arch 102 with the gingiva section 106 to implants.

The support base 120 is configured to support and position the full dental arch 102 with the gingiva section 106 on a patient's edentulous jaw. An occlusal surface 122 of the support base 120 comprises a cutout 124 for the full dental arch 102 with the gingiva section 106. The cutout 124 may have a cross-section, which is larger than a cross-section of the full dental arch 102 with the gingiva section 106. The cross-sections may, e.g., be cross-sections within planes parallel to an occlusal plane of the full dental arch 102. A plurality of connecting elements 128 connect the full dental arch 102 and gingiva section 106 with the support base 120, such that the connecting elements 128 hold the full dental arch 102 and gingiva section 106 in position over the cutout 124. The cutout 124 may allow placing the gingiva section 106 on the patient's jaw, thereby inserting abutments mounted on implants into the through-holes 108.

The cutout 124 provides a clearance 126 between the gingiva section 106 and the support base 120, which is bridged by the connecting elements 128. This clearance 126 may provide access to gingival ends of the through-holes 108 of the full dental arch 102. Via this access a curing of a bonding agent inserted into the through-holes 108 to bond abutments arranged within the through-holes 108 to the full dental arch 102 with the gingiva section 106 may be supported and/or enabled.

The bonding agent may, e.g., be a thermal composite configured to bond abutments arranged within the through-holes 108 to the full dental arch 102 with the gingiva section 106 forming, e.g., an implant-based dental bridge. The cutout 124 may, e.g., enable a cooling of the bonding agent, after having been added into the through-holes 108. In case of a thermal composite that polymerizes by mixing a powder and a liquid, a cooling may be required, in order to prevent inconveniences for the patient. In particular, any burning of the patient's mucosa may thus be prevented effectively. For cooling the bonding agent a coolant, e.g., cool water may be sprayed onto the bonding agent via the clearance 126 provided by the cutout 124.

The bonding agent may, e.g., be a light-cured composite resin. In this case, the cutout 124 may, e.g., enable an applying of light via clearance 126 to the bonding agent inserted into the through-holes 108.

For providing a suitable access to the gingival ends of the through-holes 108 from a vestibular side of the dental arch positioning setup 100, the clearance 126 may, e.g., extend along a vestibular side of gingiva section 106. For providing a suitable access to the gingival ends of the through-holes 108 from an oral side of the dental arch positioning setup 100, the clearance 126 may, e.g., extend along the oral side of gingiva section 106. For example, the clearance 126 may extend circumferentially around the full dental arch 102 with the gingiva section 106 as shown in FIG. 2.

After the bonding agent inserted in the through-holes 108 has been cured, bonding the abutments arranged in the through-holes 108 to the full dental arch 102 with the gingiva section 106, the full dental arch 102 with the gingiva section 106 may have to be detached from the support base 120. In order to enable and/or facilitate a detaching of the full dental arch 102 with the gingiva section 106 from the support base 120, the connecting elements 128 may, e.g., comprise pre-determined breaking sections 130. These pre-determined breaking sections 130 of the connecting elements 128 may be configured to enable a detaching of the full dental arch 102 with the gingiva section 106 from the support base 120 by a breaking and/or cutting of the connecting elements 128 at the pre-determined breaking sections 130. The pre-determined breaking sections 130 may, e.g., be sections at which a material thickness of the connecting elements 128 is reduced. For example, diameters of the sections 130 may be reduced. The pre-determined breaking sections 130 may, e.g., be provided by end sections 132 of the connecting elements 128. These end sections 132 may, e.g., be connected to the gingiva section 106. For example, the end sections 132 may have a reduced material thickness at the gingiva section 106. The reduced material thickness of the end sections 132 at the gingiva section 106 may facilitate a detaching of the end sections 132 from the gingiva section 106, e.g., by a breaking and/or cutting.

Figure 3:
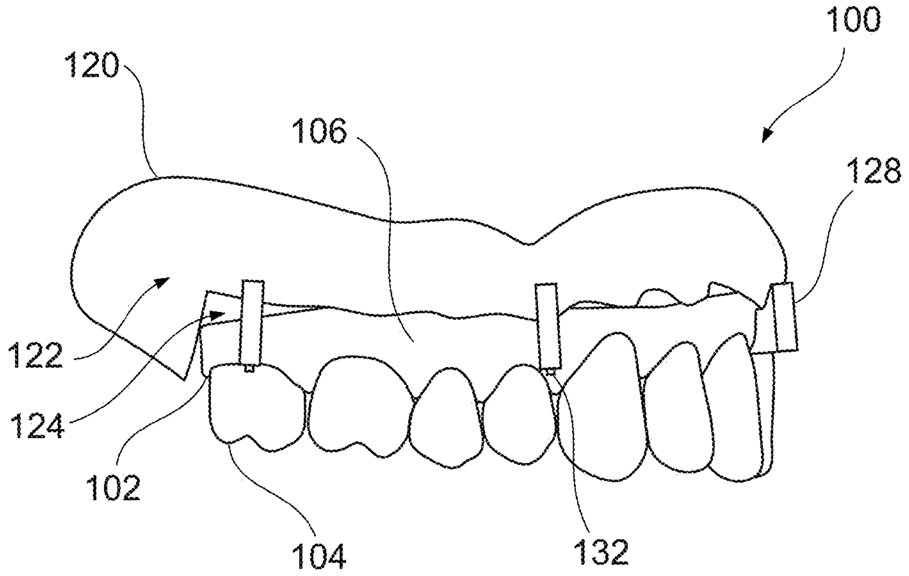
FIG. 3 shows the exemplary dental arch positioning setup of FIG. 2.

FIG. 3 shows the exemplary dental arch positioning setup 100 of FIG. 2 from the side. The view shown in FIG. 3 is a sideview of the dental arch positioning setup 100 in an oral direction. The support base 120 is configured to supports the full dental arch 102 with the gingiva section 106 on a patient's jaw. The full dental arch 102 with the gingiva section 106 is held in place at a pre-defined position by the connecting elements 128 bridging the clearance 126 provided by the cutout 124 between the gingiva section 106 and the support base 120.

Figure 4:
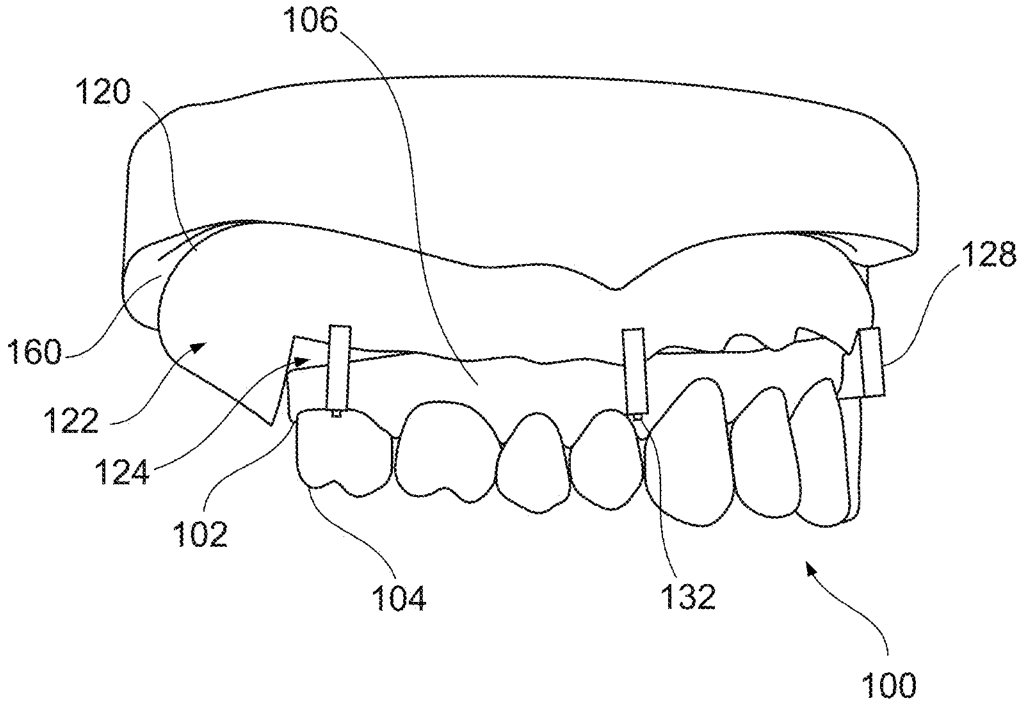
FIG. 4 shows the exemplary dental arch positioning setup of FIG. 2 arranged on a jaw.

FIG. 4 shows the exemplary dental arch positioning setup 100 of FIG. 2 arranged on a jaw 160. The view shown in FIG. 4 is a sideview of the dental arch positioning setup 100 in an oral direction. The support base 120 is configured to support the full dental arch 102 with the gingiva section 106 of the jaw 160. The support base 120 may comprise a gingival support surface that is shaped complementary to a natural gingiva of the jaw 160, on which the support base 120 is intended to be arranged. The form of the gingival support surface may be a negative of a gingiva surface of the respective gingiva such that the form of the gingival support surface matches the gingiva surface.

The dental arch positioning setup 100 may, e.g., be manufactured using methods of rapid prototyping, like 3D printing or milling. The support base 120 of the dental arch positioning setup 100 to be manufactured may be defined by a three-dimensional digital model of the dental arch positioning setup 100. The three-dimensional digital model of the dental arch positioning setup 100 may comprise a three-dimensional digital model of the support base 120. A gingival support surface of the support base 120 may, e.g., be generated using a three-dimensional digital tissue model of a patient's intraoral tissue, i.e., of the jaw 160.

This three-dimensional digital tissue model may, e.g., be generated using scan data of the intraoral tissue. The scan data of the intraoral tissue may, e.g., comprise optical scan data. The optical scan data may, e.g., comprise intraoral optical scan data or optical scan data from an optical scan of a classical mold/impression of the intraoral tissue. The optical scan data may, e.g., provide information about the surface structure of the patient's intraoral tissue comprising the gingiva.

Thus, using a dental arch positioning setup 100 with a support base 120 comprising a gingival support surface adjusted to a form of the gingiva of the jaw 160, on which the dental arch positioning setup 100 is to be arranged, may enable a positioning of the full dental arch 102 with the gingiva section 106 at a pre-defined position relative to the jaw 160. The full dental arch 102 with the gingiva section 106 is held in place at the pre-defined position by the support base 120, to which the gingiva section 106 is connected via the connecting elements 128. By holding the gingiva section 106 in place at the pre-defined position relative to the jaw 160, the through-holes comprised by the full dental arch 102 with the gingiva section 106 are held in place at pre-defined position relative to implants placed in the jaw 160. The through holes may, e.g., be aligned with the implants, e.g., planned positions of the implants, such that abutments mounted on the implants can be inserted in the through-holes, even in case the abutments are not perfectly centered within the through-holes due to slight deviations of their actual positions from the planned positions.

By holding the gingiva section 106 in place at the pre-defined position relative to the jaw 160, a position of the full dental arch 102 with the gingiva section 106 relative to the abutments mounted on the implants may in particular be held during a curing of a bonding agent arranged within the through-holes. The cutout 124 provides a clearance 126 between the gingiva section 106 and the support base 120, which is bridged by the connecting elements 128. This clearance 126 provides access to gingival ends of the through-holes 108 of the full dental arch 102.

The bonding agent may, e.g., be a thermal composite configured to bond abutments arranged within the through-holes 108 to the full dental arch 102 with the gingiva section 106 forming, e.g., an implant-based dental bridge. The cutout 124 may, e.g., enable a cooling of the bonding agent, while the full dental arch 102 with the gingiva section 106 is held in place by the support base 120. For cooling the bonding agent a coolant, e.g., cool water may be sprayed onto the bonding agent via the clearance 126 provided by the cutout 124. The bonding agent may, e.g., be a light-cured composite resin. In this case, the cutout 124 may, e.g., enable an applying of light via clearance 126 to the bonding agent inserted into the through-holes 108, while the full dental arch 102 with the gingiva section 106 is held in place by the support base 120.

After the bonding agent has been cured, the full dental arch 102 with the gingiva section 106 and the abutments bonded in the trough-holes may be detached from the support base 120 by detaching the gingiva section 106 from the connecting elements 128. The resulting implant-based bridge comprising the full dental arch 102 with the gingiva section 106 may, e.g., be the equal to the implant-based bridge of FIG. 1.

Figure 5:
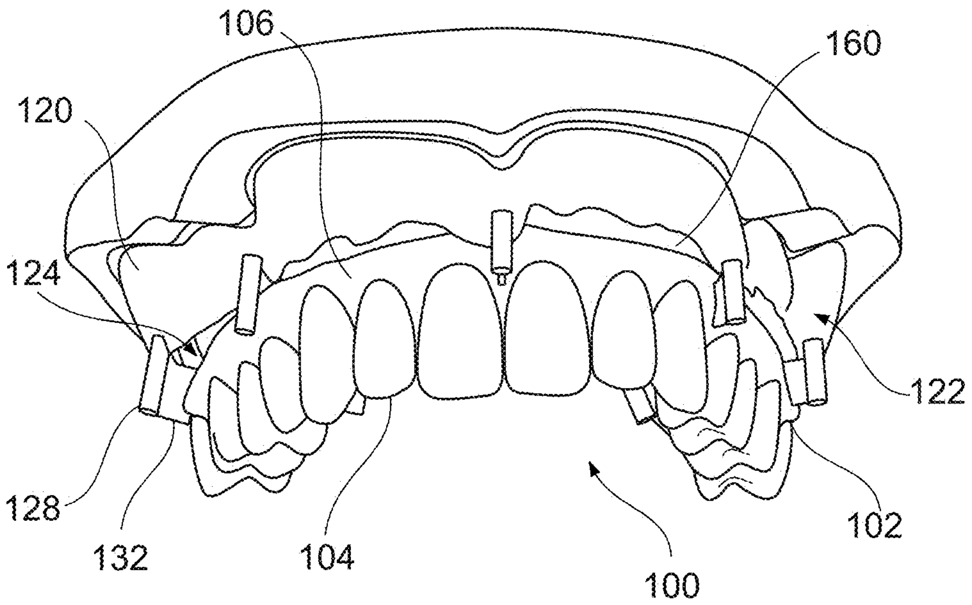
FIG. 5 shows the exemplary dental arch positioning setup of FIG. 2 arranged on a jaw.

FIG. 5 shows the same exemplary dental arch positioning setup 100 arranged on a jaw 160 as FIG. 4. The view shown in FIG. 5 is a perspective front view in oral direction onto the dental arch positioning setup 100. The cutout 124 extends inter alia along a vestibular side of the dental arch positioning setup 100 and in particular the gingiva section 106. Thus, a suitable access to the gingival ends of the through-holes from a vestibular side of the dental arch positioning setup 100 may be enabled. The cutout 124 is bridged by the connecting elements 128 holding the gingiva section 106 in place.

Figure 6:
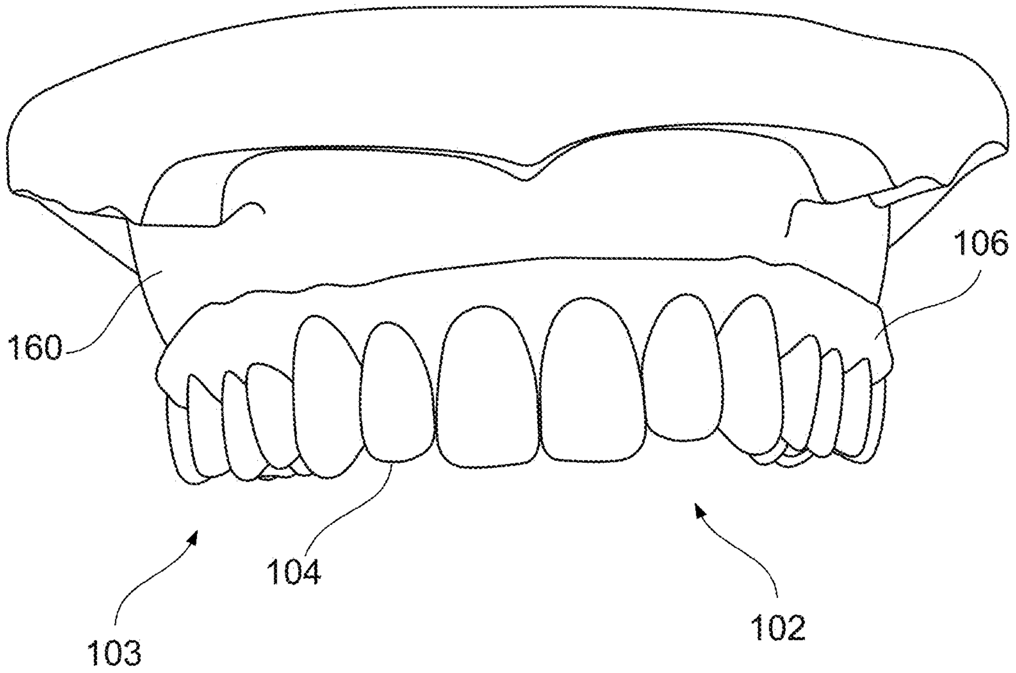
FIG. 6 shows an exemplary full dental arch arranged on a jaw.

FIG. 6 shows the exemplary full dental arch 102 with the gingiva section 106 of the dental arch positioning setup of FIG. 4 arranged on the jaw 160. The full dental arch 102 with the gingiva section 106 may, e.g., form an implant-based bridge 103 equal to the implant-based bridge of FIG. 1, which comprises a plurality of through-holes with abutments bonded therein. The abutments may be precisely aligned with actual positions of implants placed in the jaw 160. Via the abutments and implants, the bridge 103 may be fastened to the jaw 160.

After the bonding agent has been cured, the full dental arch 102 with the gingiva section 106 and the abutments bonded in the trough-holes may be detached from the support base by detaching the gingiva section 106 from the connecting elements. The connecting elements may be cut and/or broken, e.g., using pre-determined breaking sections. The remaining bridge 103 comprising the full dental arch 102 and gingiva section 106 is shown in FIG. 6.

Figure 7:
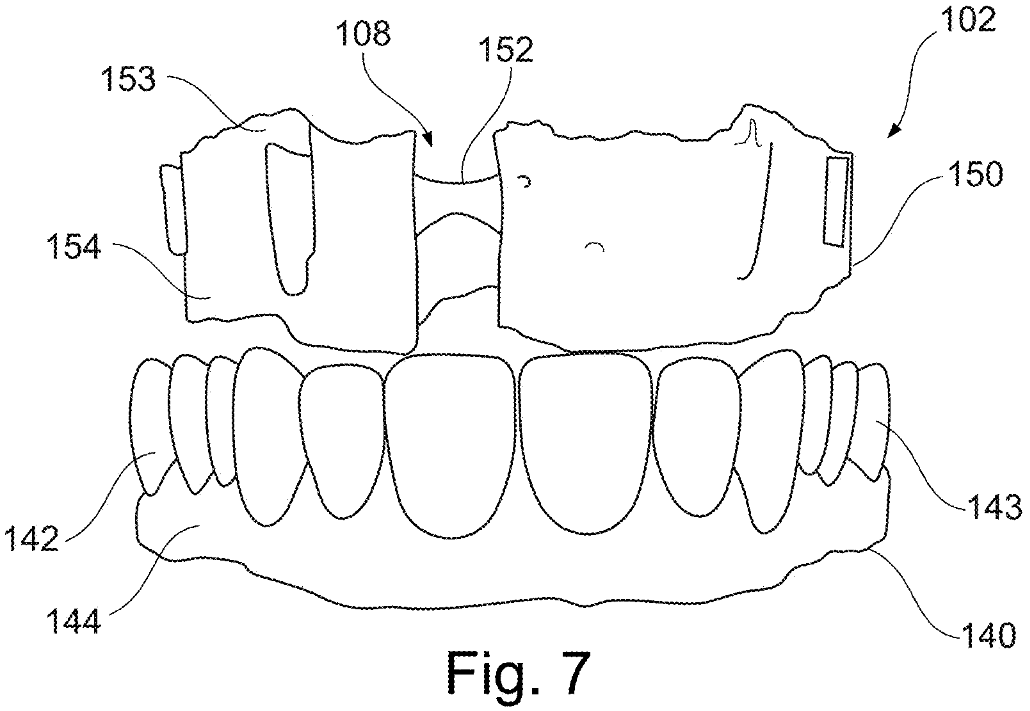
FIG. 7 shows an exploded-view of an exemplary full dental arch and gingiva section in a two-part form.

FIG. 7 shows an exploded-view of an exemplary dental arch positioning setup 100 with a full dental arch 102 and gingiva section 106 in a two-part form. The view shown in FIG. 7 is a front view in oral direction onto the exploded dental arch positioning setup 100. The two-part form of the full dental arch 102 and the gingiva section 106 may, e.g., comprise a vestibular part 140 and an oral part 150. Vestibular part 140 and oral part 150 are configured complementary to each other. The vestibular part 140 may, e.g., comprise a vestibular tooth subpart 142 with a plurality of vestibular tooth elements 143 and a vestibular gingiva subpart 144. The oral part 150 may, e.g., comprise an oral tooth subpart 152 with a plurality of oral tooth elements 153 and an oral gingiva subpart 154. The vestibular tooth subpart 142 is, e.g., configured complementary to the oral tooth subpart 152. For example, the vestibular tooth elements 143 may each be configured complementary to one of the oral tooth elements 153. The vestibular gingiva subpart 144 is, e.g., configured complementary to the oral gingiva subpart 154. A two-part form of the full dental arch 102 and gingiva section 106 may, e.g., allow access to the section of jaw, where the implants are set as long as the oral part 150 is not attached to the vestibular part 140. A two-part form of the full dental arch 102 and gingiva section 106 may, e.g., facilitate an arranging of abutments within the through-holes 108 of the full dental arch 102 and gingiva section 106. With the oral part 150 removed, the remaining dental arch positioning setup 100 may, e.g., be usable as a surgery guide and/or a drilling guide.

The oral part 150 may be bonded to the vestibular part 140 using a bonding agent. This bonding agent may, e.g., be a different second bonding agent different from a first bonding agent used for bonding the abutments within the trough-holes 108. This bonding agent may, e.g., be the same bonding agent as the bonding agent used for bonding the abutments within the trough-holes 108, i.e., first and second bonding agent may be same in this case.

For example, an alignment of the trough-holes 108 with the abutments mounted on set implants may be checked before bonding the oral part 150 to the vestibular part 140. In case a misalignment of trough-holes 108 and abutments exceeds a pre-defined threshold and/or the abutments cannot be arranged within the trough-holes 108 due to a misalignment, e.g., the oral part 150 may be replaced by an adjusted oral part with adjusted forms, sizes, and/or positions of the trough-holes 108 or at least of the part of the trough-holes 108 comprised by the oral part 150.

Figure 8:
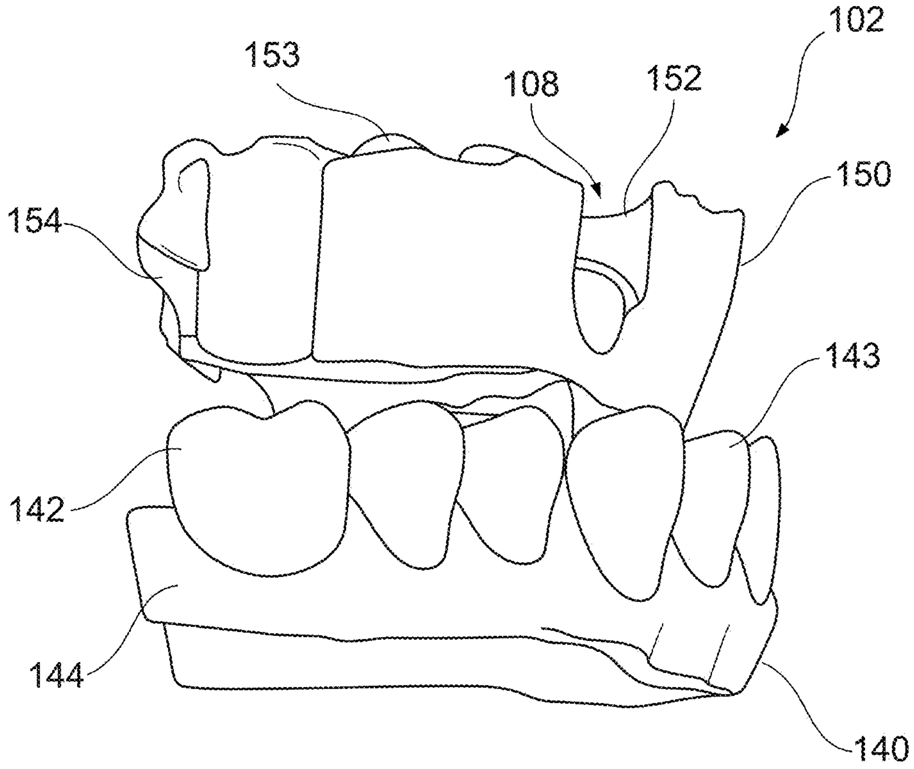
FIG. 8 shows an exploded-view of the exemplary full dental arch and gingiva section of FIG. 7 in the two-part form.
Figure 9:
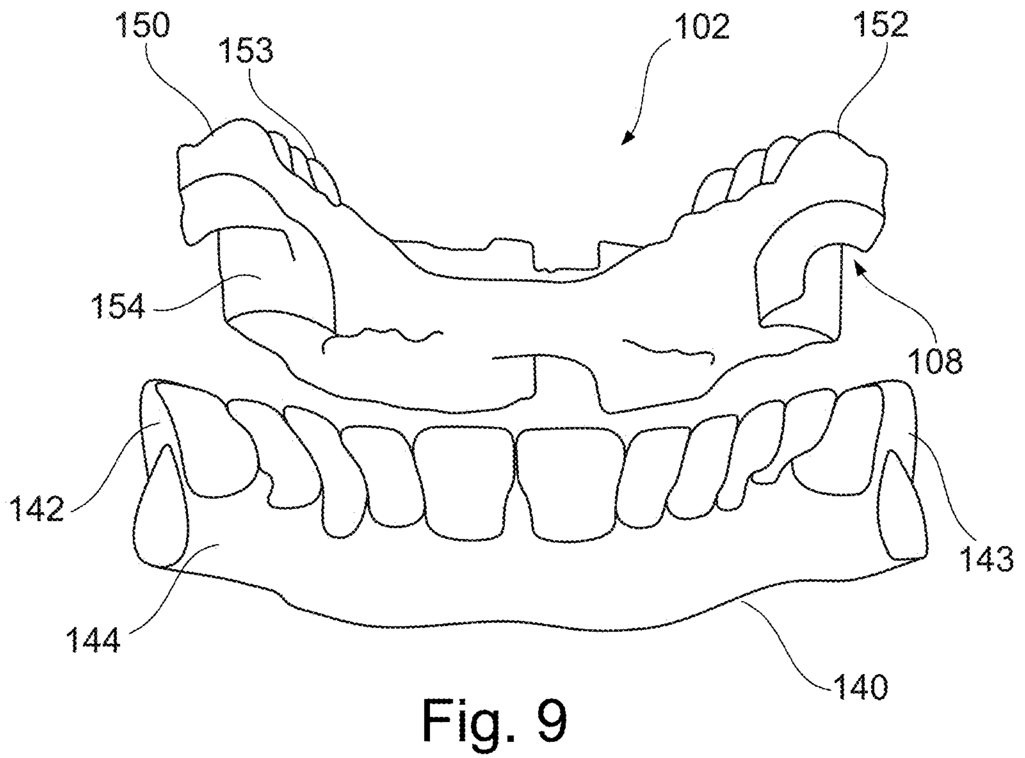
FIG. 9 shows an exploded-view of the exemplary full dental arch and gingiva section of FIG. 7 in the two-part form.

FIG. 8 shows another exploded view of the exemplary dental arch positioning setup 100 of FIG. 7 with a full dental arch 102 and gingiva section 106 in a two-part form. The view shown in FIG. 8 is a sideview in oral direction onto the exploded view of the dental arch positioning setup 100. FIG. 9 shows another exploded view of the exemplary dental arch positioning setup 100 of FIG. 7 with a full dental arch 102 and gingiva section 106 in a two-part form. The view shown in FIG. 9 is a rearview in vestibular direction onto the exploded view of the dental arch positioning setup 100.

Figure 10:
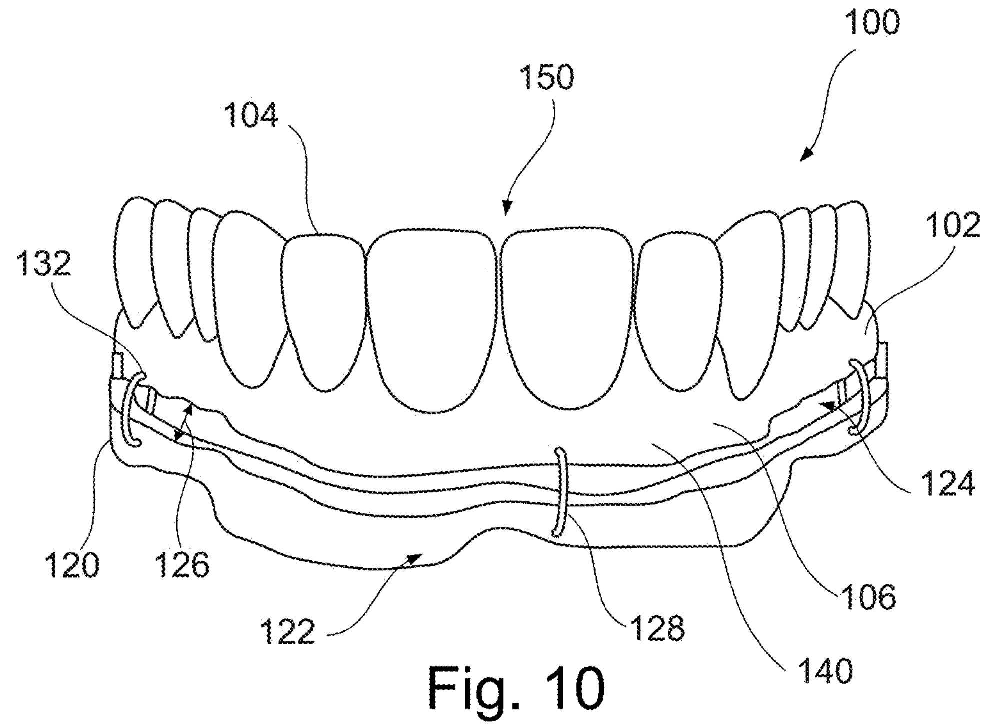
FIG. 10 shows an exemplary dental arch positioning setup with the full dental arch and gingiva section of FIG. 7 in the two-part form.

FIG. 10 shows the exemplary dental arch positioning setup 100 with the full dental arch 102 and gingiva section 106 of FIG. 7 in the two-part form connected to a base part 120. In FIG. 10, the oral part 150 is attached to the vestibular part 140, i.e., FIG. 10 is a not exploded view. The oral part 150 may be bonded to the vestibular part 140 using a bonding agent. This bonding agent may, e.g., be a different second bonding agent different from a first bonding agent used for bonding the abutments within the trough-holes 108. This bonding agent may, e.g., be the same bonding agent as the bonding agent used for bonding the abutments within the trough-holes 108, i.e., first and second bonding agent may be same in this case.

For example, only the vestibular part 140 of the full dental arch 102 with the gingiva section 106 is connected to the support base 120 via the connecting elements 128. These connecting elements 128 are holding the vestibular part 140 in place. The oral part 150 may, e.g., be held by the bonding to the vestibular part 140. The cutout 124 provides a clearance 126 between the vestibular gingiva subpart 144 and the support base 120, which is bridged by the connecting elements 128. The cutout 124 extends inter alia along a vestibular side of the dental arch positioning setup 100 and in particular along the vestibular gingiva subpart 144. Thus, a suitable access to the gingival ends of the through-holes from a vestibular side of the dental arch positioning setup 100 may be enabled through the clearance 126 provided by the cutout 124.

Figure 11:
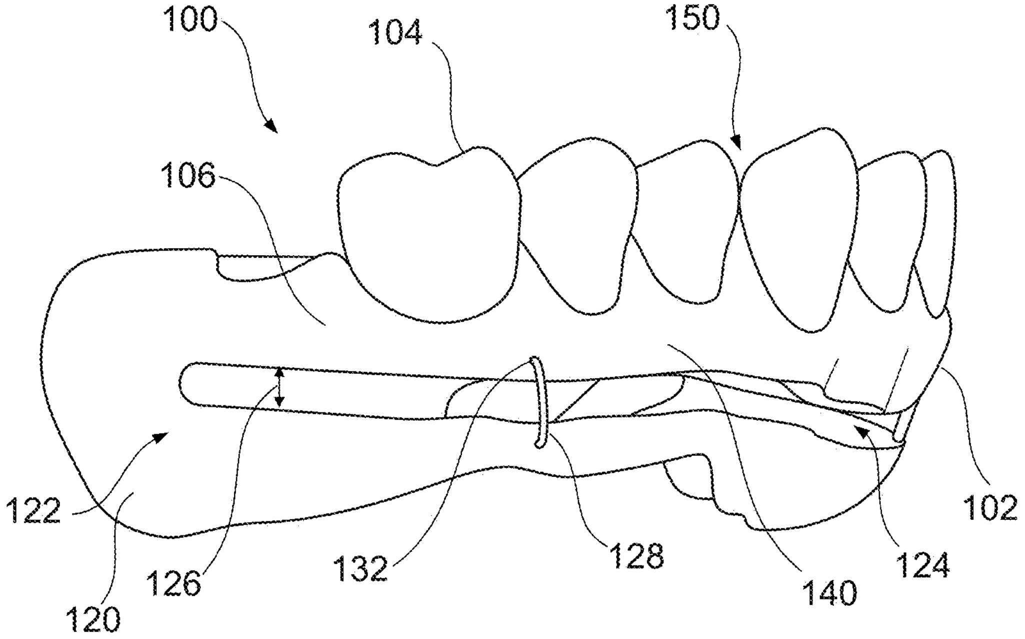
FIG. 11 shows the exemplary dental arch positioning setup of FIG. 10 with the full dental arch and gingiva section in the two-part form.
Figure 12:
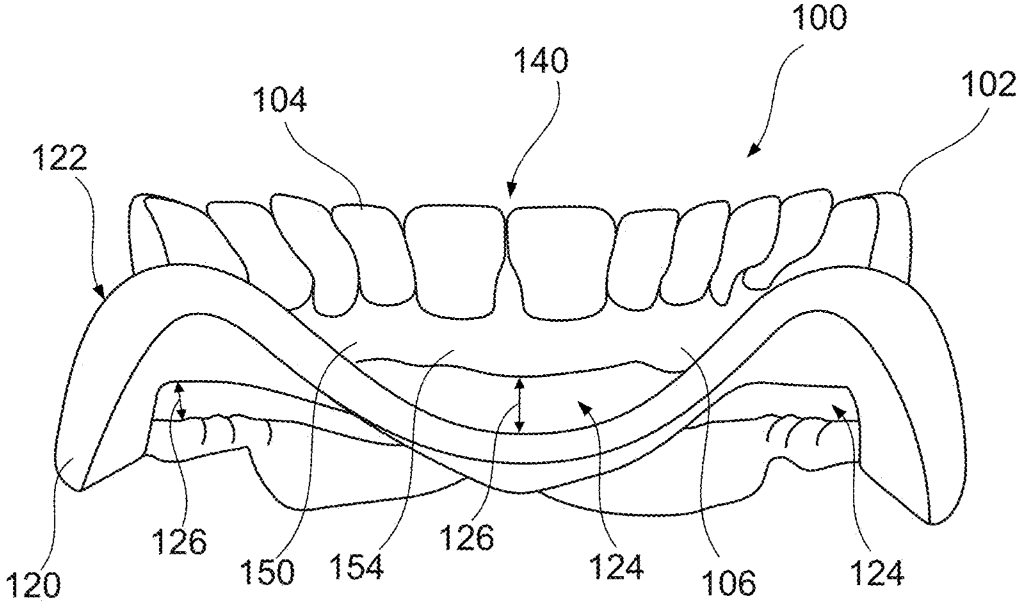
FIG. 12 shows the exemplary dental arch positioning setup of FIG. 10 with the full dental arch and gingiva section in the two-part form.

FIG. 11 shows the exemplary dental arch positioning setup 100 of FIG. 10 with a full dental arch 102 and gingiva section 106 in a two-part form. The view shown in FIG. 11 is a sideview in oral direction onto the dental arch positioning setup 100. FIG. 12 shows the exemplary dental arch positioning setup 100 of FIG. 10 with a full dental arch 102 and gingiva section 106 in a two-part form. The view shown in FIG. 12 is a rearview in vestibular direction onto the dental arch positioning setup 100. The cutout 124 also extends along an oral side of the dental arch positioning setup 100 and in particular along the oral gingiva subpart 154. Thus, a suitable access to the gingival ends of the through-holes may also be enabled from an oral side of the dental arch positioning setup 100 through the clearance 126 provided by the cutout 124.

Figure 13:
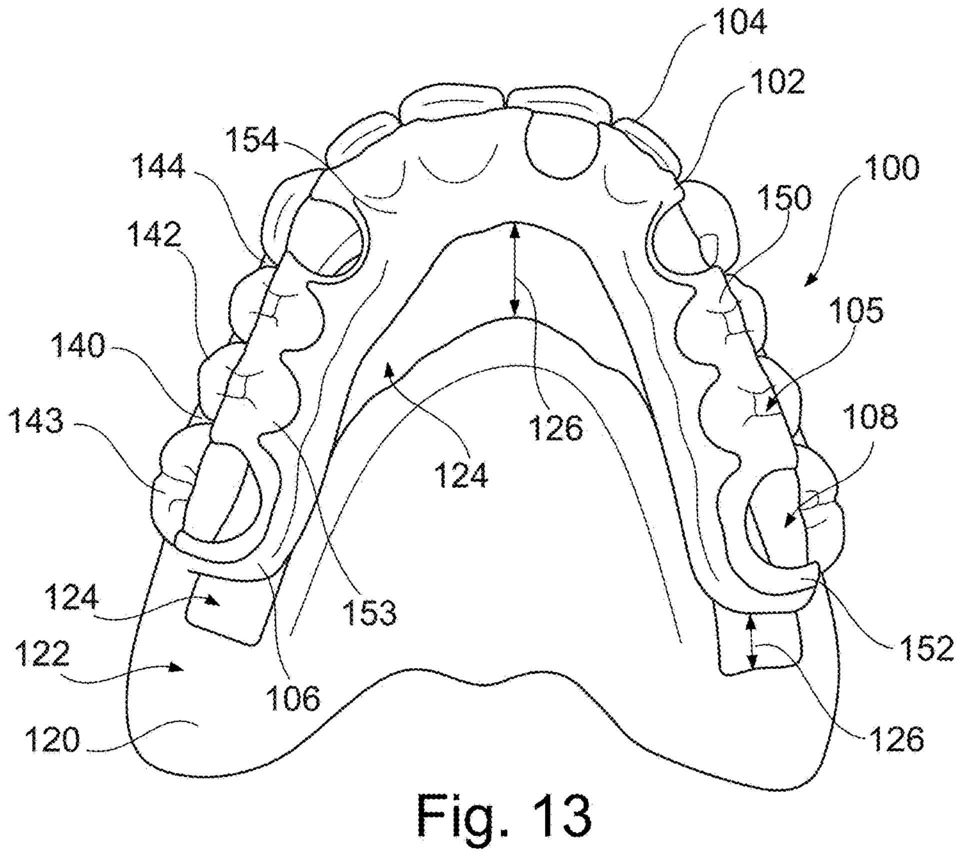
FIG. 13 shows the exemplary dental arch positioning setup of FIG. 10 with the full dental arch and gingiva section in the two-part form.
Figure 14:
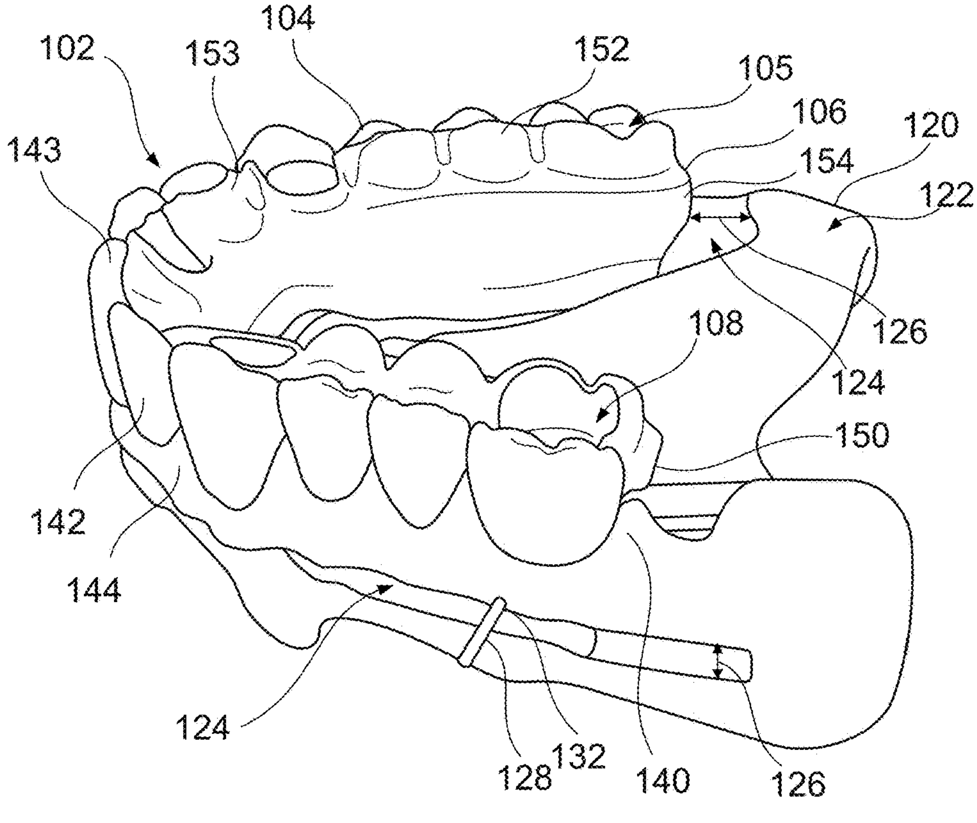
FIG. 14 shows the exemplary dental arch positioning setup of FIG. 10 with the full dental arch and gingiva section in the two-part form.

FIG. 13 shows the exemplary dental arch positioning setup 100 of FIG. 10 with a full dental arch 102 and gingiva section 106 in a two-part form. The view shown in FIG. 13 is a view in gingival direction onto the dental arch positioning setup 100. The two-part form of the full dental arch 102 and the gingiva section 106 comprises a vestibular part 140 and an oral part 150, which are configured complementary to each other. The full dental arch 102 and gingiva section 106 comprise a plurality of through-holes 108 extending through the oral part 150. The cutout 124 extends, e.g., along an oral side of the gingiva section 106. FIG. 14 shows the exemplary dental arch positioning setup 100 of FIG. 10 with a full dental arch 102 and gingiva section 106 in a two-part form. The view shown in FIG. 14 is a perspective sideview in oral direction onto the dental arch positioning setup 100. The cutout 124 extends, e.g., along an oral side of the gingiva section 106, i.e., along the oral gingiva subpart 154. The cutout 124 further extends, e.g., along a vestibular side of the gingiva section 106, i.e., along the vestibular gingiva subpart 144. For example, the vestibular gingiva subpart 144 of the vestibular part 140 may further be connected to the support base 120 at its distal ends. In order to detach the full dental arch 102 and gingiva section 106 from the support base 120, the connecting elements 128 may be broken and/or cut, e.g., at the end sections 132 of the connecting elements 128. These end sections 132 of the connecting elements 128 may, e.g., comprise pre-determined breaking sections. Furthermore, e.g., the connection of the vestibular gingiva subpart 144 at its distal ends to the support base 120 may be cut as well.

Figure 15:
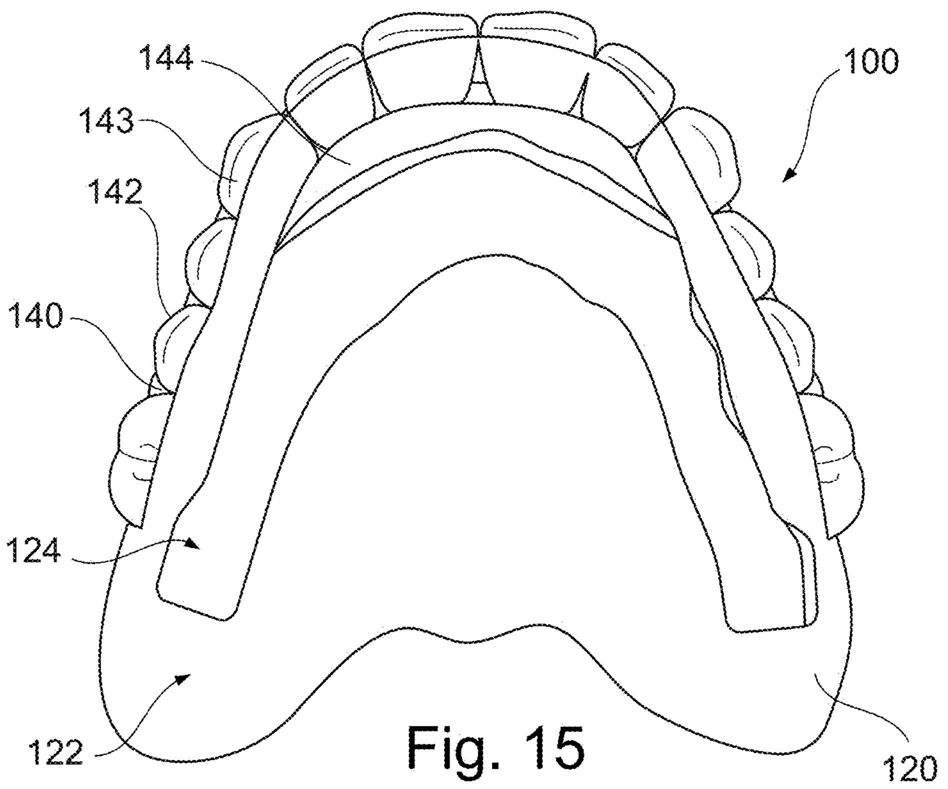
FIG. 15 shows the exemplary dental arch positioning setup of FIG. 10 with an oral part of the full dental arch and gingiva section removed.
Figure 16:
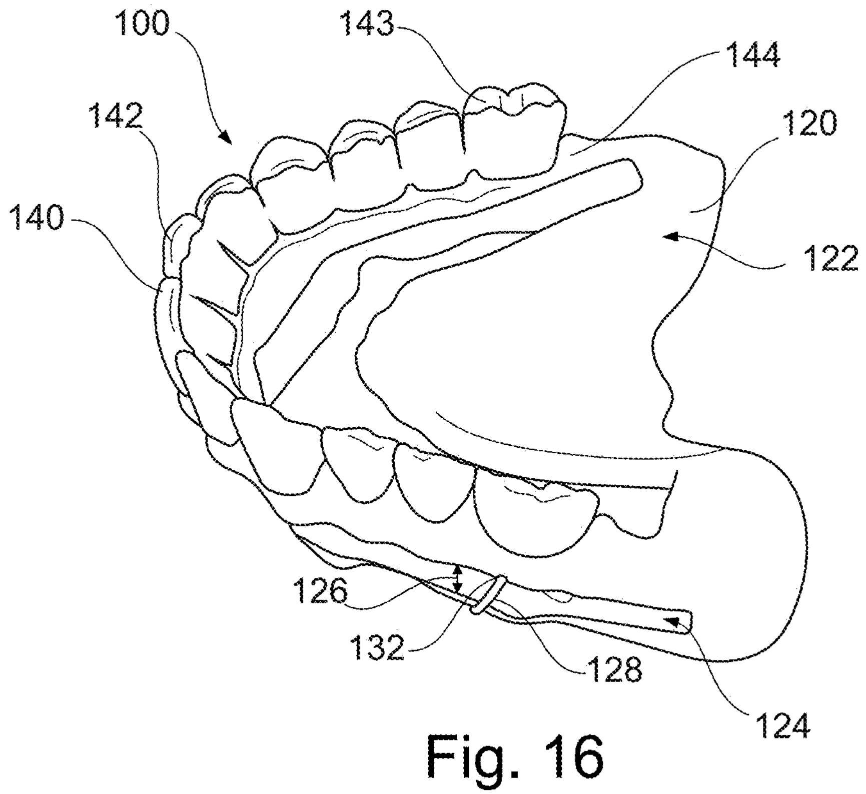
FIG. 16 shows the exemplary dental arch positioning setup of FIG. 10 with the oral part of the full dental arch and gingiva section removed.

FIG. 15 shows the exemplary dental arch positioning setup 100 of FIG. 10 with the oral part 150 of the full dental arch 102 and gingiva section 106 removed. The remaining dental arch positioning setup 100 comprises the support base 120 and the vestibular part 140 of the full dental arch 102 and the gingiva section 106. The vestibular part 140 may, e.g., comprise a vestibular tooth subpart 142 with a plurality of vestibular tooth elements 143 and a vestibular gingiva subpart 144. The view shown in FIG. 15 is a view from above in the gingival direction onto the dental arch positioning setup 100. FIG. 16 also shows the exemplary dental arch positioning setup 100 of FIG. 10 with the oral part 150 of the full dental arch 102 and gingiva section 106 removed. The view shown in FIG. 16 is a perspective sideview onto the dental arch positioning setup 100. The cutout 124 extends, e.g., along a vestibular side of the gingiva section 106, i.e., along the vestibular gingiva subpart 144. For example, the vestibular gingiva subpart 144 of the vestibular part 140 may further be connected to the support base 120 at its distal ends. In order to detach the full dental arch 102 and gingiva section 106 from the support base 120, the connecting elements 128 may be broken and/or cut, e.g., at the end sections 132 of the connecting elements 128. These end sections 132 of the connecting elements 128 may, e.g., comprise pre-determined breaking sections. Furthermore, e.g., the connection of the vestibular gingiva subpart 144 at its distal ends to the support base 120 may be cut as well.

Figure 17:
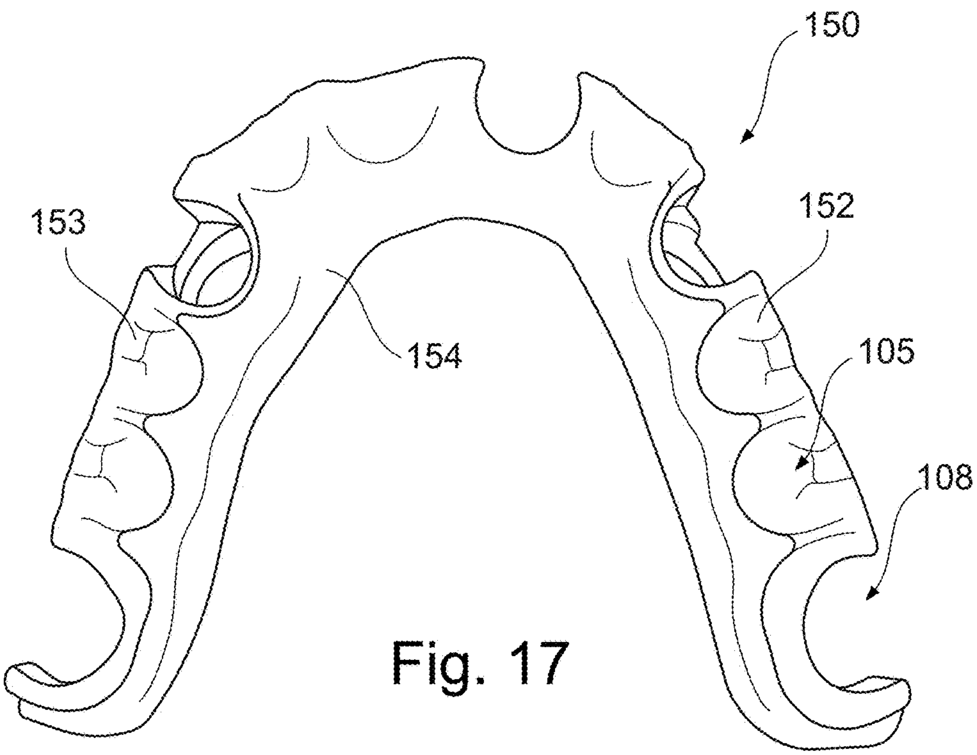
FIG. 17 shows the oral part of the full dental arch and gingiva section of the exemplary dental arch positioning setup of FIG. 10.

FIG. 17 shows the oral part 150 of the full dental arch 102 and gingiva section 106 of the exemplary dental arch positioning setup 100 of FIG. 10. The oral part 150 may, e.g., comprise an oral tooth subpart 152 with a plurality of oral tooth elements 153 and an oral gingiva subpart 154. The oral tooth subpart 152 is, e.g., configured complementary to the vestibular tooth subpart 142 of the vestibular part of FIG. 15. For example, the oral tooth elements 153 may each be configured complementary to one of the vestibular tooth elements 143 of FIG. 15. The oral gingiva subpart 154 is, e.g., configured complementary to the vestibular gingiva subpart 144 of FIG. 15. The oral part 150 further comprises a plurality of through-holes 108 configured for receiving abutments.

Figure 18:
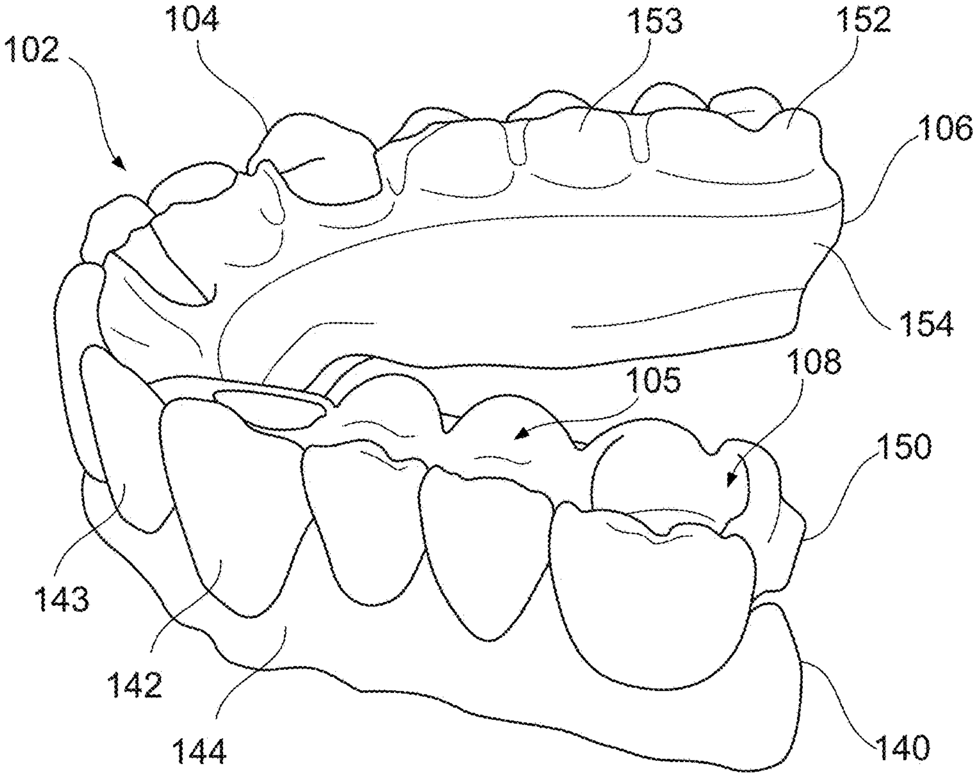
FIG. 18 shows the exemplary full dental arch and gingiva section of FIG. 7 in the two-part form.

FIG. 18 shows the exemplary full dental arch 102 and gingiva section 106 of FIG. 10 in the two-part form detached from the support base 120. The detached two-part form of the full dental arch 102 and the gingiva section 106 may, e.g., comprise a vestibular part 140 and an oral part 150. Vestibular part 140 and oral part 150 are configured complementary to each other. The vestibular part 140 may, e.g., comprise a vestibular tooth subpart 142 with a plurality of vestibular tooth elements 143 and a vestibular gingiva subpart 144. The oral part 150 may, e.g., comprise an oral tooth subpart 152 with a plurality of oral tooth elements 153 and an oral gingiva subpart 154. The vestibular tooth subpart 142 is, e.g., configured complementary to the oral tooth subpart 152. For example, the vestibular tooth elements 143 may each be configured complementary to one of the oral tooth elements 153. The vestibular gingiva subpart 144 is, e.g., configured complementary to the oral gingiva subpart 154. A two-part form of the full dental arch 102 and gingiva section 106 may, e.g., allow access to the section of jaw, where the implants are set as long as the oral part 150 is not attached to the vestibular part 140. A two-part form of the full dental arch 102 and gingiva section 106 may, e.g., facilitate an arranging of abutments within the through-holes 108 of the full dental arch 102 and gingiva section 106. With the oral part 150 removed, the remaining dental arch positioning setup 100 may, e.g., be usable as a surgery guide and/or a drilling guide.

The oral part 150 may be bonded to the vestibular part 140 using a bonding agent. This bonding agent may, e.g., be a different second bonding agent different from a first bonding agent used for bonding the abutments within the trough-holes 108. This bonding agent may, e.g., be the same bonding agent as the bonding agent used for bonding the abutments within the trough-holes 108, i.e., first and second bonding agent may be same in this case.

Figure 19:
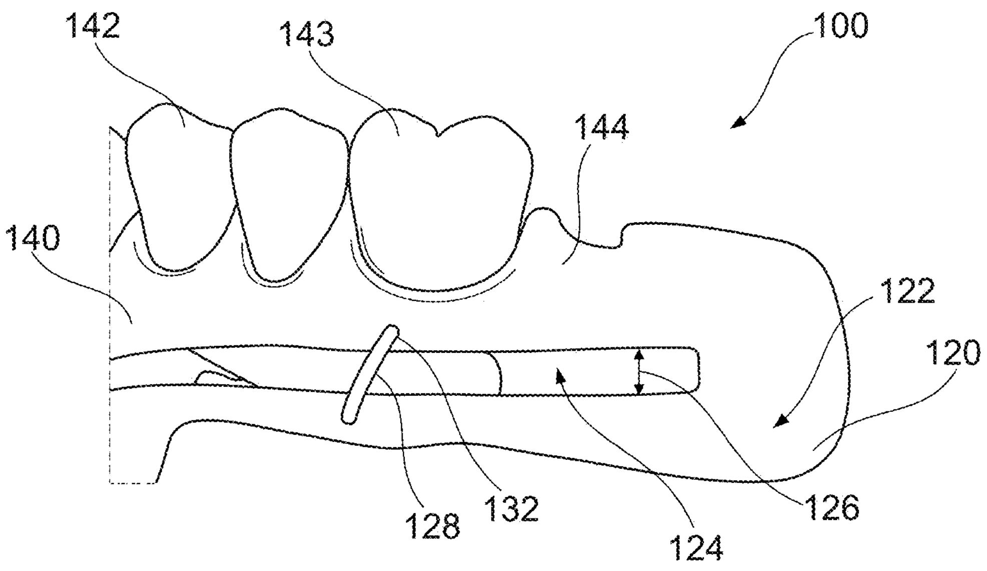
FIG. 19 shows a distal end of an exemplary dental arch positioning setup with a connecting element.

FIG. 19 shows a detail view of a distal end of the exemplary dental arch positioning setup 100 of FIG. 16 with the oral part 150 of the full dental arch 102 and gingiva section 106 removed. The remaining dental arch positioning setup 100 comprises the support base 120 and the vestibular part 140 of the full dental arch 102 and the gingiva section 106. The vestibular part 140 may, e.g., comprise a vestibular tooth subpart 142 with a plurality of vestibular tooth elements 143 and a vestibular gingiva subpart 144. The view shown in FIG. 19 is a sideview in the oral direction onto the distal end of the support base 120 and the vestibular part 140. The cutout 124 extends, e.g., along a vestibular side of the gingiva section 106, i.e., along the vestibular gingiva subpart 144. The clearance 126 provided by the cutout 124 is bridged by the connecting elements 128 connecting the vestibular part 140 to the support base 120. In order to detach the vestibular part 140 from the support base 120, the connecting elements 128 may be broken and/or cut, e.g., at the end sections 132 of the connecting elements 128. These end sections 132 of the connecting elements 128 may, e.g., comprise pre-determined breaking sections. For example, the vestibular gingiva subpart 144 of the vestibular part 140 may further be connected to the support base 120 at the distal end. To detach the vestibular part 140, e.g., the connection of the vestibular gingiva subpart 144 to the support base 120 at its distal end may be cut as well.

Figure 20:
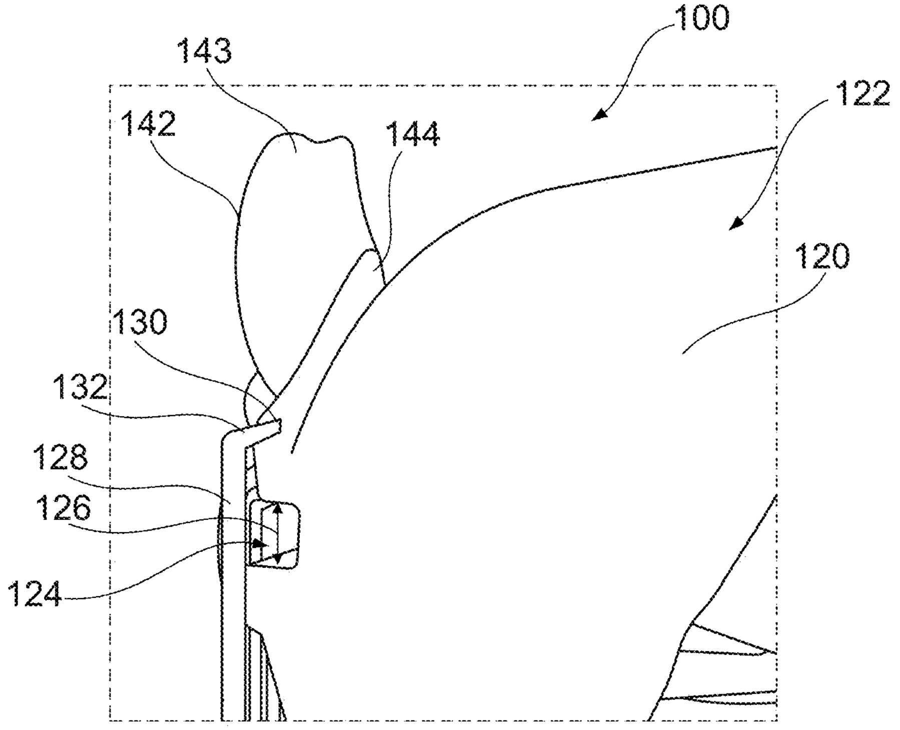
FIG. 20 shows a distal end of an exemplary dental arch positioning setup with connecting elements.

FIG. 20 shows distal end of the exemplary dental arch positioning setup 100 of FIG. 19 with the oral part 150 of the full dental arch 102 and gingiva section 106 removed. The view shown in FIG. 20 is a rearview onto the distal end in the mesial direction. The cutout 124 extending along the vestibular gingiva subpart 144 forms a clearance 126 by the connecting elements 128 connecting the vestibular part 140 to the support base 120. The connecting elements 128 comprise pre-determined breaking sections 130 configured to enable a detaching of the vestibular part 140 from the support base 120 by a breaking of the connecting elements 128 at the pre-determined breaking sections 130. The pre-determined breaking sections 130 are provided by end sections 132 of the connecting elements 128. The end sections 132 are connected to the gingiva section 106, in case of FIG. 20 to the vestibular gingiva subpart 144. Furthermore, the end sections 132 are tapered towards the gingiva section 106, e.g., the vestibular gingiva subpart 144. The tapering may result in a reduction of a material thickness, e.g., a diameter of the end sections 132, which may facilitate a breaking and/or cutting of the end sections 132. For example, the end sections 132 of the connecting elements 128 have conical forms.

Figure 21:
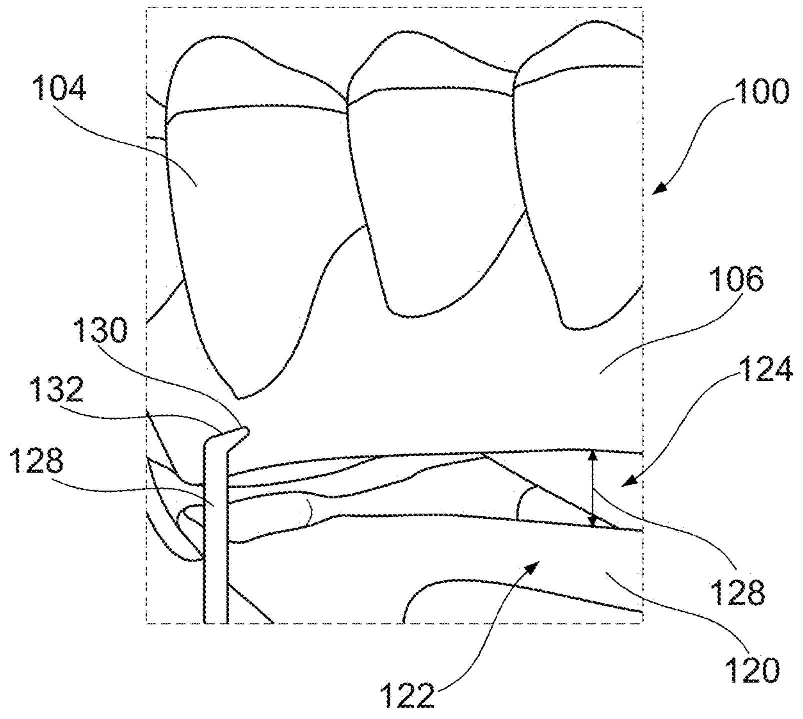
FIG. 21 shows a detail view of an exemplary dental arch positioning setup with a connecting element.
Figure 22:
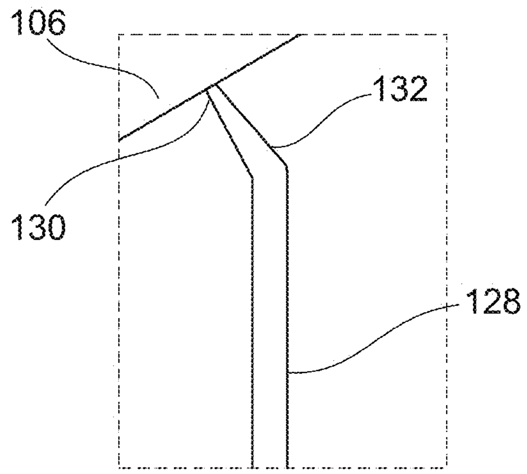
FIG. 22 shows an exemplary connecting element.

FIG. 21 shows a connecting element 128 of FIG. 20 with the tapered end section 132 providing the pre-determined breaking section 130 from another point of view. FIG. 22 shows the exemplary tapered connecting element 128 in detail. The end section 132 of the connecting element 128 is tapered towards the gingiva section 106. The tapering may result in a reduction of a material thickness, e.g., a diameter of the end section 132, which may facilitate a breaking and/or cutting of the end section 132. The end section 132 of the connecting element 128, e.g., has a conical form. The end section 132 with its conical form may form a cone attachment tip with only a small contact cross-section to the gingiva section 106 for enabling an easy detaching of the gingiva section 106 from the connecting element 128 and consequently from the support base.

Figure 23:
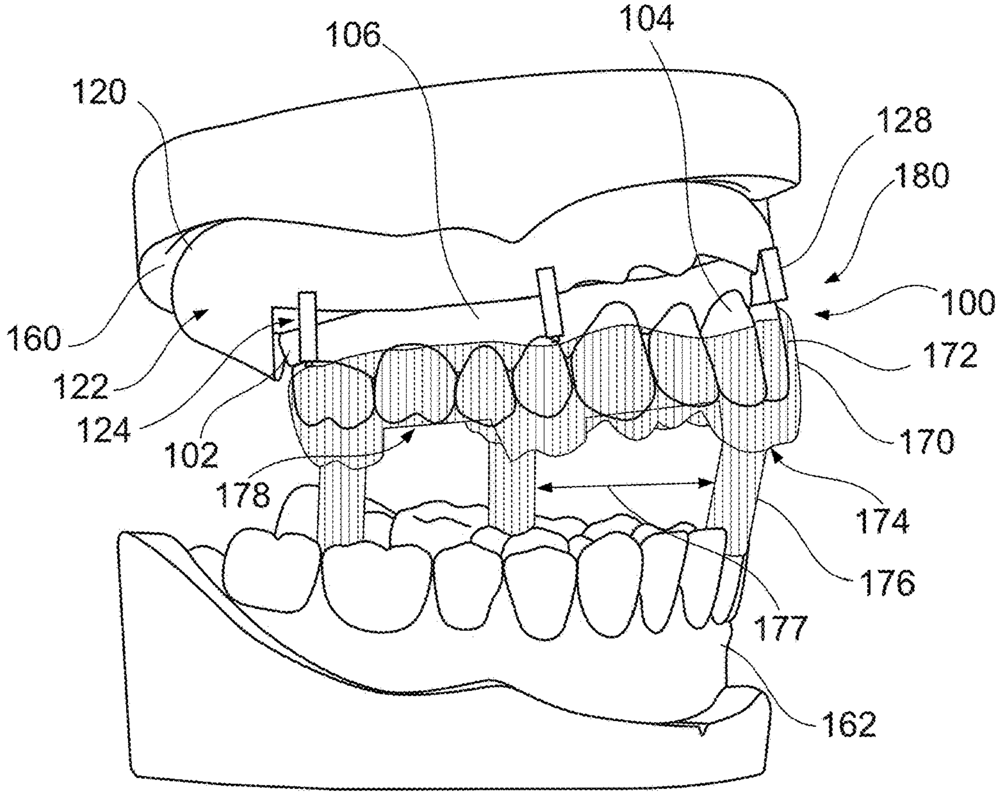
FIG. 23 shows an exemplary dental arch positioning setup with a bite index.
Figure 24:
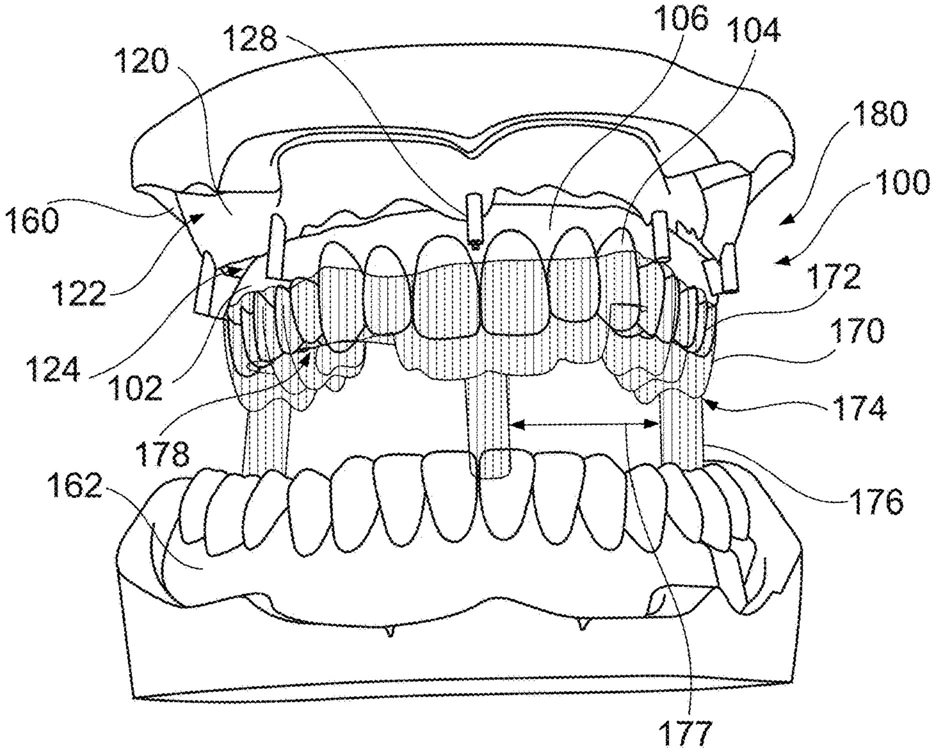
FIG. 24 shows the exemplary dental arch positioning setup with the bite index of FIG. 23.

FIGS. 23 and 24 show an exemplary assembly 180 comprising a dental arch positioning setup 100 with a bite index 170. The dental arch positioning setup 100 of FIG. 23 is, e.g., identical to the dental arch positioning setup 100 of FIG. 2. The dental arch positioning setup 100 is arranged on a first jaw 160, e.g., an edentulous jaw. The bite index 170 comprises a reception section 172 with a reception, in which the bite index 170 receives the full dental arch 102 of the dental arch positioning setup 100. The reception section 172 of the bite index 170 may, e.g., have the form of a bite splint. The reception provided by the reception section 172 may, e.g., be a negative of a geometric form of the full dental arch 102. For example, a three-dimensional digital model of the full dental arch 102 may be used to define the reception of the reception section 172. The bite index 170 may further comprise one or more spacing elements 176 configured to establish a pre-defined spacing between the dental arch positioning setup 100 and the patient's second jaw 162. For example, spacing elements 176 may comprise one or more pillars. For example, each of the spacing elements 176 may be formed by a pillar configured for supporting the bite index 170 on a second jaw 162 of a patient opposite of the first jaw 160, on which the dental arch positioning setup 100 is arranged by the bite index 170. The spacing elements 176 of the bite index 170 may support the dental arch positioning setup 100 in a pre-defined position relative to the patient's second jaw 162 on the patient's first jaw 160. This pre-defined position may, e.g., be a pre-defined occlusion. The dental arch positioning setup 100 and the bite index 170 may be arranged between the two jaws 160, 162 of a patient. When, the patient bites on the dental arch positioning setup 100 and the bite index 170, the dental arch positioning setup 100 may be held in place in a pre-defined position on the first jaw 160. For example, the spacing elements 176 are arranged on an occlusal surface 174 of the bite index 170, i.e., of the reception section 172 of the bite index 170.

The spacing elements 176 may, e.g., be spaced apart from each other providing clearances 177 between spacing elements 176. The clearances 177 may be configured for allowing access to the patient's oral cavity and especially to an oral section of the cutout 124 of the dental arch positioning setup 100, while the patient bits on the dental arch positioning setup 100 arranged within the bite index 170. Thus, a bonding agent inserted into the through-holes, in order to bond abutments to the full dental arch 102 with the gingiva section 106, may be cooled and/or provided with light via the accessible oral section of the cutout 124.

For cooling the bonding agent a coolant, e.g., cool water may have to be sprayed onto the bonding agent, which may be challenging when the patient has to keep the mouth closed, e.g., in order to maintain a correct occlusion. For example, the bonding agent may, e.g., be a light-cured composite resin. However, also applying light onto the bonding agent may be challenging when the patient has to keep the mouth closed, e.g., in order to maintain a correct occlusion. Using the bite index 170, the correct occlusion may be maintained, while still providing access to the patient's oral cavity. For example, the spacing elements 176 may be configured to arrange the dental arch positioning setup 100 in a pre-defined position relative to the first jaw 160, which corresponds to a correct occlusion of the full dental arch 102.

For example, the occlusal surface 174 of the reception section 172 of the bite index 170 may comprises one or more cutouts 178, i.e., cutouts 178 of the bite index 170. These cutouts 178 of the bite index 170 are configured for providing access to through-holes comprised by the full dental arch 102 of the dental arch positioning setup 100, i.e., to the occlusal ends of the through-holes, when the full dental arch 102 is arranged within the reception of the reception section 172. Using a bite index 170 may enable an execution of the bonding of abutments to the dental arch positioning setup 100 at an opened patient mouth. The spacing elements 176 may be kept open, while providing access via the clearances 177. The opened patient mouth with the bite index 170 may provide access the occlusal ends of the through-holes of the full dental arch 102, i.e., the occlusal abutment screw channels, as well as to the gingival ends of the through-holes via the clearances 126 of the dental arch positioning setup 100.

Figure 25:
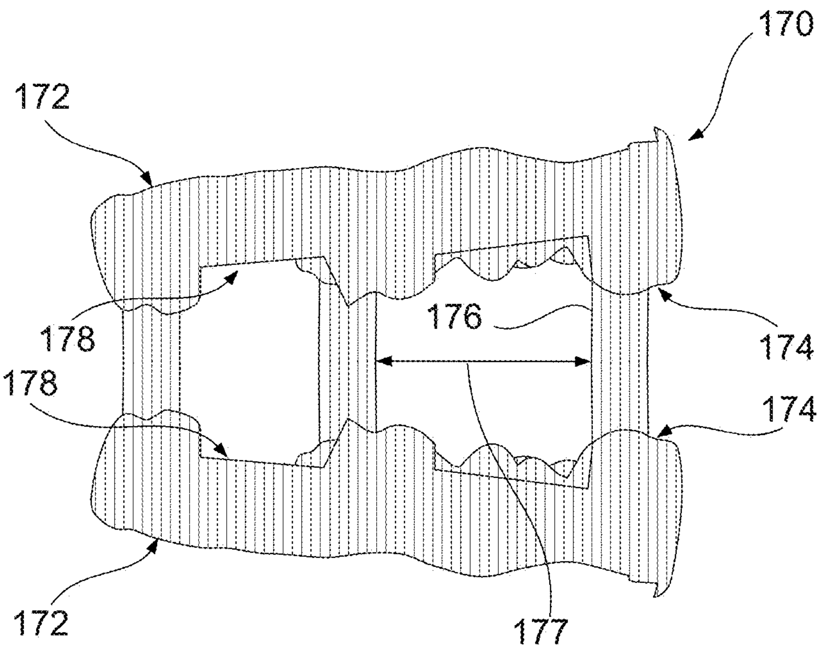
FIG. 25 shows an exemplary bite index.

FIG. 25 shows another exemplary bite index 170. The bite index 170 comprises two reception sections 172. Each reception section 172 provides a reception, in which the bite index 170 receives a full dental arch of a dental arch positioning setup. Thus, the bite index 170 may be configured for arranging two dental arch positioning setups on opposite jaws. The reception sections 172 of the bite index 170 may, e.g., have the form of a bite splints. The receptions provided by the reception sections 172 may each be a negative of a geometric form of the full dental arch 102 to be received by the respective reception sections 172. The bite index 170 may further comprise one or more spacing elements 176 connecting the two reception sections of the bite index with each. The spacing elements 176 may establish a predefined spacing between the two reception sections 172 of the bite index 170, thereby arranging the same in a pre-defined distance from each other. The spacing elements 176 may arrange two reception sections 172 of the bite index 170 in pre-defined positions relative to each other.

For example, spacing elements 176 may comprise one or more pillars. For example, each of the spacing elements 176 may be formed by a pillar configured for connecting the two reception sections 172 with each other. The spacing elements 176 of the bite index 170 may support the two dental arch positioning setups in pre-defined positions on opposite jaws of the patient. These pre-defined positions may, e.g., correspond to a pre-defined occlusion. The dental arch positioning setups and the bite index 170 may be arranged between the two opposite jaws. When the patient bites on the dental arch positioning setups connected with each other by the bite index 170, the dental arch positioning setups may each be held in place in a pre-defined position on one of the jaws. For example, the spacing elements 176 are arranged on occlusal surfaces 174 of the bite index 170, i.e., of the reception sections 172 of the bite index 170.

Figure 26:
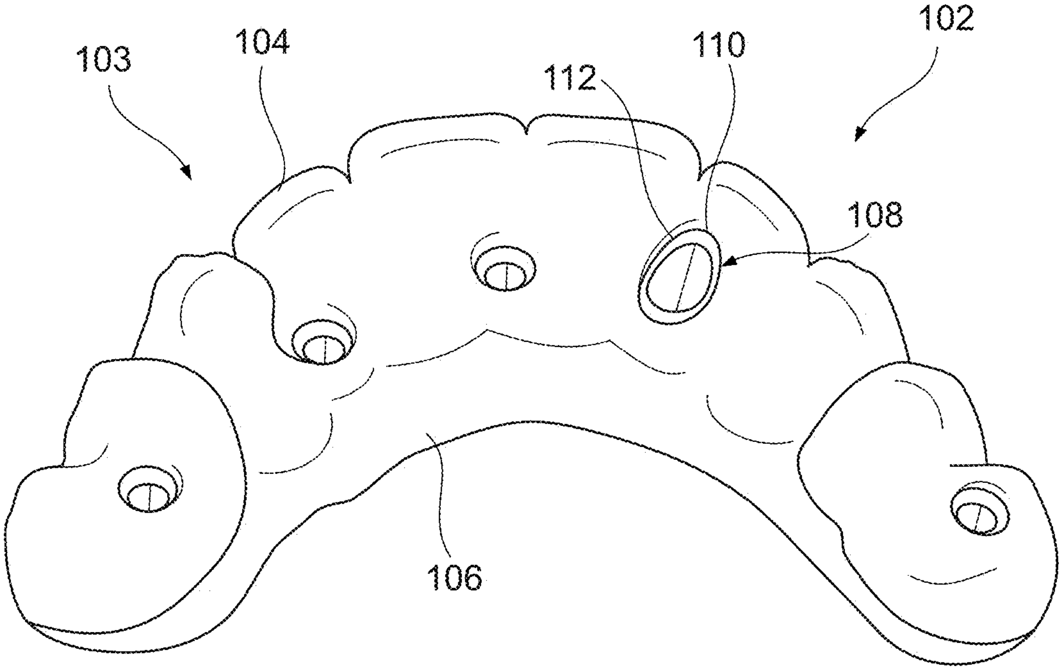
FIG. 26 shows an exemplary implant-based bridge in form of a full dental arch with gingiva section.

FIG. 26 shows an exemplary implant-based bridge 103, which may, e.g., identical with the bridge 103 of FIG. 1. The bridge 103 of FIG. 26 is provided in form of a full dental arch 102 with a gingiva section 106. The full dental arch 102 comprises a plurality of artificial teeth 104 in form of a complete set of artificial teeth 104. The view shown in FIG. 26 is a perspective view onto an upper, i.e., occlusal side of the full dental arch 102. The bridge 103 is configured as an implant-based bridge retained at a patient's jaw using implants. For this purpose, the full dental arch 102 comprises a plurality of through-holes 108 extending through the full dental arch 102 with the gingiva section 106. Within these through-holes 108 abutments 110 are arranged. These abutments 110 are configured for attaching the full dental arch 102 with the gingiva section 106 to the implants.

The abutments 110 received in the through-holes 108 are bonded to the full dental arch 102 using a bonding agent 112. The though-holes 108 may have cross-sections extending perpendicular to length axes of the through-holes 108, which are larger than cross-sections of the abutments 110 extending perpendicular to length axes of the abutments. Thus, deviations of positions of the abutments 110 from a center of the through-holes 108, which may be required for aligning the abutments 110 with implants set in a patient's jaw, may be compensated using the larger cross-sections of the through-holes 108. Despite slight deviations of the implants from planned position within the patient's jaw, it may thus still be possible to arrange the abutments 110 fastened to the implants within the through-holes 108. When the implants are set, the abutments 110 may be arranged on the implants and may have to be bonded to the full dental arch 102. For this purpose, the full dental arch 102 may be arranged on a patient's jaw using the dental arch positioning setup described herein, such that the abutments 110 are arranged within the through-holes 108, and the abutments 110 arranged within the through-holes 108 may be bonded to the full dental arch 102 using a bonding agent 112. Thus, the abutments 110 may be fixated in position precisely aligned with the set implants, even in case slight deviations of the exact final positions of the implants may occur relative to planned positions of the implants, when placing the implants. For example, the through-holes 108 are arranged within the full dental arch 102, such that they are aligned with the planned positions of the implants, when the full dental arch 102 is arranged on the patient's jaw at a pre-defined position.

Figure 27:
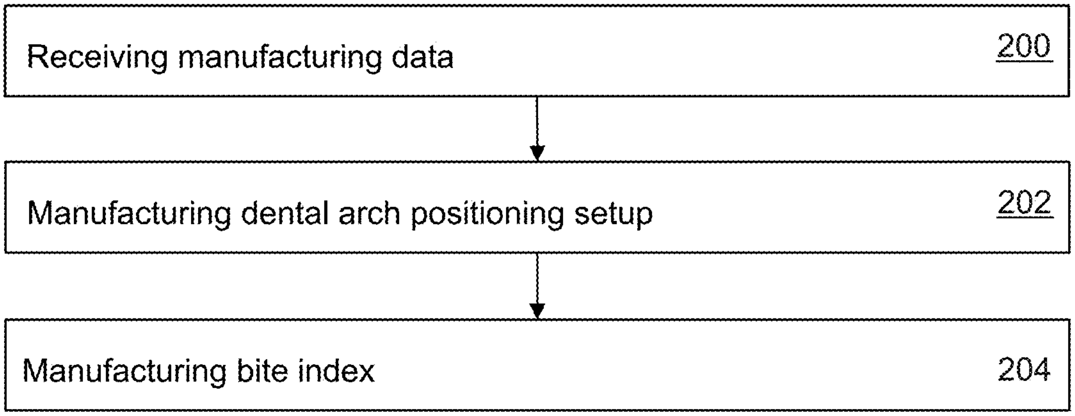
FIG. 27 shows an exemplary method for manufacturing a dental arch positioning setup.

FIG. 27 shows an exemplary method for manufacturing a dental arch positioning setup. In block 200 manufacturing data is received. The manufacturing data defines a first three-dimensional digital model of a dental arch positioning setup as a first template for manufacturing the dental arch positioning setup. The dental arch positioning setup comprises a full dental arch with a gingiva section and a support base. The support base is configured to support and position the full dental arch with the gingiva section on a patient's edentulous first jaw. An occlusal surface of the support base comprises a cutout for the full dental arch with the gingiva section. The cutout has a cross-section larger than a cross-section of the full dental arch with the gingiva section. A plurality of connecting elements connects the full dental arch and gingiva section with the support base. The plurality of connecting elements holds the full dental arch with the gingiva section in position over the cutout. The full dental arch comprises a plurality of through-holes extending through the full dental arch with the gingiva section. The through-holes are configured to receive abutments for attaching the full dental arch with the gingiva section to implants.

In block 202, the dental arch positioning setup is manufactured using the first three-dimensional digital model of the dental arch positioning setup provided by the manufacturing data as the first template for the manufacturing.

For example, the manufacturing data received in block 200 further defines a second three-dimensional digital model of a bite index as a second template for manufacturing the bite index. The bite index comprises a reception section with a reception for receiving the full dental arch of the dental arch positioning setup and one or more spacing elements configured to establish a pre-defined spacing between the dental arch positioning setup and the patient's second jaw, when dental arch positioning setup is arranged on the patient's edentulous first jaw.

In optional block 204, the bite index is manufactured using the second three-dimensional digital model of the bite index provided by the manufacturing data as the second template for the manufacturing.

For example, the manufacturing data received in block 200 defines two three-dimensional digital models of two dental arch positioning setups. The two dental arch positioning setups may be two dental arch positioning setups for two opposite jaws, e.g., two opposite edentulous jaws of a patient. In block 202, e.g., the two dental arch positioning setups may be manufactured using the two three-dimensional digital models of the two dental arch positioning setups. In case of two dental arch positioning setups, the bite index defined by the second three-dimensional digital model of a bite index may, e.g., comprises a second reception section with a second reception for receiving a second full dental arch of the second dental arch positioning setup. The spacing elements of the bite index connect the two reception sections of the bite index with each.

For example, the three-dimensional digital model of the dental arch positioning setup may be generated using a three-dimensional digital tissue model of intraoral tissue of the patient. The three-dimensional digital tissue model may comprise one or two three-dimensional digital models of one or two jaws of a patient. The jaws may, e.g., be edentulous shows. This three-dimensional digital tissue model may, e.g., be generated using scan data of the intraoral tissue. The scan data of the intraoral tissue may, e.g., comprise optical scan data. The optical scan data may, e.g., comprise intraoral optical scan data or optical scan data from an optical scan of a classical mold/impression of the intraoral tissue. The optical scan data may, e.g., provide information about the surface structure of the patient's intraoral tissue comprising the gingiva.

The three-dimensional digital model of the dental arch positioning setup may be adjusted to the three-dimensional digital tissue model. For example, a gingival surface of the support base of the dental arch positioning setup may be adjusted to a surface of the three-dimensional digital tissue model, on which the support base is to be arranged. For example, the full dental arch may be generated using a plurality of three-dimensional digital tooth models of artificial teeth. For providing the three-dimensional digital tooth models of the artificial teeth, e.g., library teeth may be used. For example, scans of natural teeth may be used for providing the three-dimensional digital tooth models of the artificial teeth. For example, the three-dimensional digital tooth models of the artificial teeth may be generated from scratch. For example, planned positions of the implants to be set may be used for determining positions of the through-holes within the dental arch positioning setup.

The three-dimensional digital model of the bite index may be generated using the three-dimensional digital model of the dental arch positioning setup and a three-dimensional digital tissue model of intraoral tissue of the patient.

Figure 28:
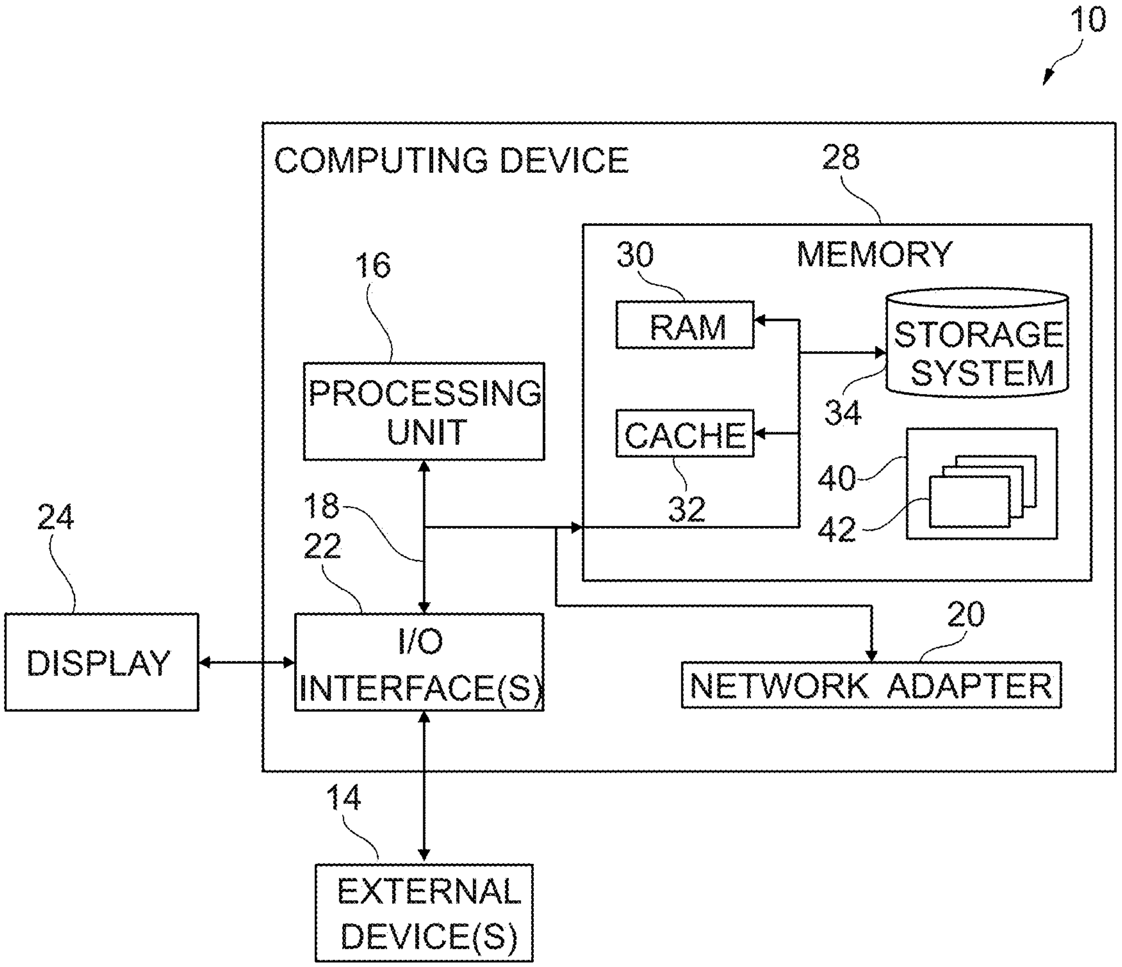
FIG. 28 shows an exemplary computing device for providing manufacturing data for manufacturing a three-dimensional digital model of a dental arch positioning setup.

FIG. 28 shows a schematic diagram of an exemplary computing device 10 for providing three-dimensional digital models of one or more dental arch positioning setups. Furthermore, the exemplary computing device 10 may be configured for providing a three-dimensional digital model of a bite index. The computing device 10 may be operational with numerous other general-purpose or special-purpose computing system environments or configurations. Computing device 10 may be described in the general context of computing device executable instructions, such as program modules comprising executable program instructions, being executable by the computing device 10. Generally, program modules may include routines, programs, objects, components, logic, data structures, and so on that perform particular tasks or implement particular abstract data types, Computing device 10 may be practiced in distributed computing environments where tasks are performed by remote processing devices that are linked through a communications network. In a distributed computing environment, program modules may be located in both local and remote computing device storage media including memory storage devices.

In FIG. 28, computing device 10 is shown in the form of a general-purpose computing device. The components of computing device 10 may include, but are not limited to, one or more processors or processing units 16, a system memory 28, and a bus 18 that couples various system components including system memory 28 to processor 16. Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing device 10 may comprise a variety of computing device readable storage media. Such media may be any available storage media accessible by computing device 10, and include both volatile and non-volatile storage media, removable and non-removable storage media.

A system memory 28 may include computing device readable storage media in the form of volatile memory, such as random-access memory (RAM) 30 and/or cache memory 32. Computing device 10 may further include other removable/non-removable, volatile/non-volatile computing device storage media. For example, storage system 34 may be provided for reading from and writing to a non-removable, non-volatile magnetic media also referred to as a hard drive. For example, a magnetic disk drive for reading from and writing to a removable, non-volatile magnetic disk, e.g., a floppy disk, and an optical disk drive for reading from or writing to a removable, non-volatile optical disk such as a CD-ROM, DVD-ROM or other optical storage media may be provided. In such instances, each storage medium may be connected to bus 18 by one or more data media interfaces. Memory 28 may, e.g., include manufacturing data. The manufacturing data may, e.g., define a one or more three-dimensional digital models of one or more dental arch positioning setups as templates for manufacturing the dental arch positioning setups. Such a dental arch positioning setup defined by one of the three-dimensional digital models may comprise a full dental arch with a gingiva section and a support base. The support base is configured to support and position the full dental arch with the gingiva section on a patient's edentulous first jaw. An occlusal surface of the support base comprises a cutout for the full dental arch with the gingiva section. The cutout has a cross-section larger than a cross-section of the full dental arch with the gingiva section. A plurality of connecting elements connects the full dental arch and gingiva section with the support base. The plurality of connecting elements holds the full dental arch with the gingiva section in position over the cutout. The full dental arch comprises a plurality of through-holes extending through the full dental arch with the gingiva section. The through-holes are configured to receive abutments for attaching the full dental arch with the gingiva section to implants.

The manufacturing data may, e.g., define a three-dimensional digital model of a bite index as a template for manufacturing the bite index. The bite index may comprise a reception section with a reception for receiving the full dental arch of the dental arch positioning setup and one or more spacing elements configured to establish a predefined spacing between the dental arch positioning setup and the patient's second jaw, when dental arch positioning setup is arranged on the patient's edentulous first jaw. For example, the bite index may be configured for holding two second dental arch positioning setups in position on opposite jaws, e.g., edentulous jaws of a patient. In this case, the bite index further comprises a second reception section with a second reception for receiving a second full dental arch of the second dental arch positioning setup. The spacing elements of the bite index connect the two reception sections of the bite index with each.

Memory 28 may, e.g., include scan data of a patient's mouth from an intraoral scan of the patient's intraoral tissue or from a scan of a classical mold/impression of the patient's intraoral tissue. The scan data may thus, e.g., providing information about the surface structure of the patient's intraoral tissue comprising the gingiva. Memory 28 may, e.g., include a three-dimensional digital model of a patient's intraoral tissue. This three-dimensional digital tissue model may, e.g., be generated using the scan data of the intraoral tissue. The three-dimensional digital tissue model may, e.g., be used for generating the three-dimensional digital models of the one or more dental arch positioning setups and/or of a bite index.

Program 40 may have a set of one or more program modules 42 and by way of example be stored in memory 28. The program modules 42 may comprise an operating system, one or more application programs, other program modules, and/or program data. Each of these program modules 42, i.e., the operating system, the one or more application programs, the other program modules, and/or the program data or some combination thereof, may include an implementation of a networking environment. One or more of the program modules 42 may, e.g., be configured for controlling a manufacturing of one or more dental arch positioning setups and/or a bite index. The respective program modules 42 may, e.g., be configured for controlling an execution of the method for manufacturing dental arch positioning setups and/or a bite index of FIG. 27. One or more of the program modules 42 may, e.g., be configured for generating the manufacturing data. In particular, one or more of the program modules 42 may, e.g., be configured for generating the three-dimensional digital models of the one or more dental arch positioning setups and/or the bite index.

Computing device 10 may further communicate with one or more external devices 14 such as a keyboard, a pointing device, like a mouse, and a display 24 enabling a user to interact with computing device 10. Such communication can occur via input/output (I/O) interfaces 22. Computing device 10 may further communicate with one or more networks such as a local area network (LAN), a general wide area network (WAN), and/or a public network, like the Internet, via network adapter 20. Network adapter 20 may communicate with other components of computing device 10 via bus 18. It should be understood that although not shown, other hardware and/or software components could be used in conjunction with computing device 10.

Figure 29:
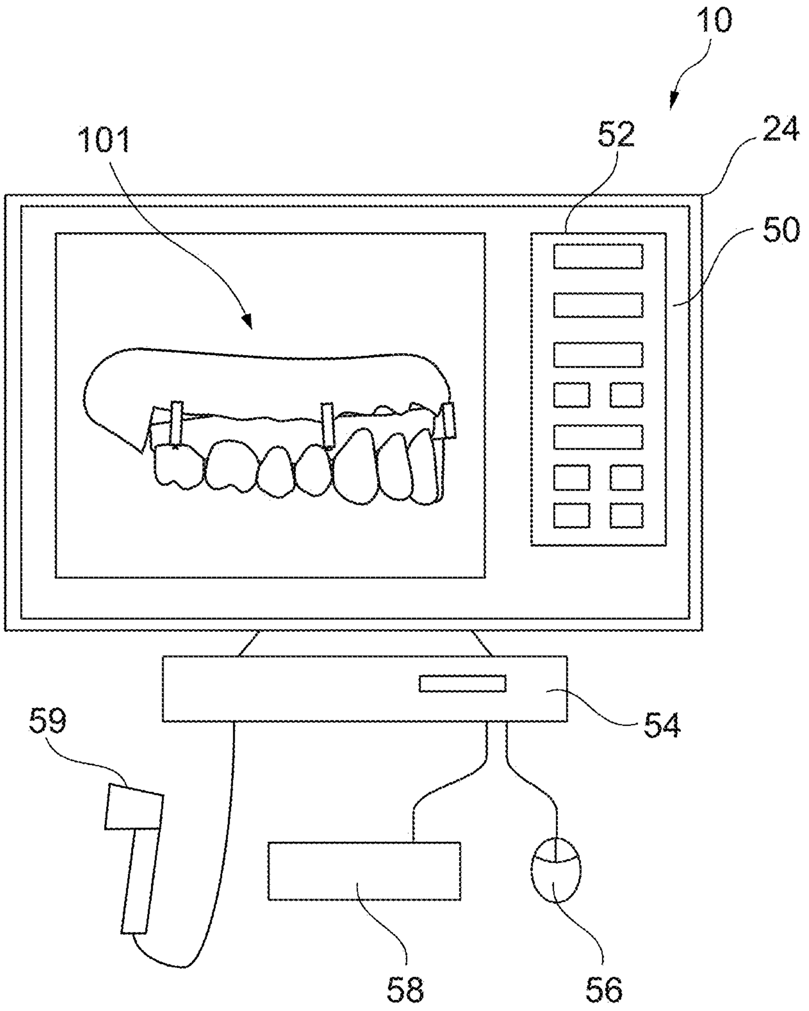
FIG. 29 shows an exemplary computing device for providing manufacturing data for manufacturing a three-dimensional digital model of a dental arch positioning setup.

FIG. 29 shows an exemplary computing device 10 for providing three-dimensional digital models of one or more dental arch positioning setups. Furthermore, the exemplary computing device 10 may be configured for providing a three-dimensional digital model of a bite index. The computing device 10 may, e.g., be configured as shown in FIG. 28. The computing device 10 may comprise a hardware component 54 comprising one or more processors as well as a memory storing machine-executable program instructions. Execution of the program instructions by the one or more processing units may cause the one or more processing units to control the computing device 10 to provide the manufacturing data comprising three-dimensional digital models of one or more dental arch positioning setups and/or a bite index.

The computing device 10 may further comprise one or more input devices, like a keyboard 58 and a mouse 56, enabling a user to interact with the computing device 10. Furthermore, the computing device 10 may comprise one or more output devices, like a display 24 providing a graphical user interface 50 with control elements 52, e.g., GUI elements, enabling the user to control, e.g., a generating of the manufacturing data, i.e., the three-dimensional digital models and/or a manufacturing of the one or more dental arch positioning setups and/or the bite index using the manufacturing data. The computing device 10 may further comprise an intraoral scanner 59, e.g., configured for scanning a patient's oral cavity, an imprint of a patient's oral cavity and/or a positive of a patient's oral cavity generated using an imprint.

Figure 30:
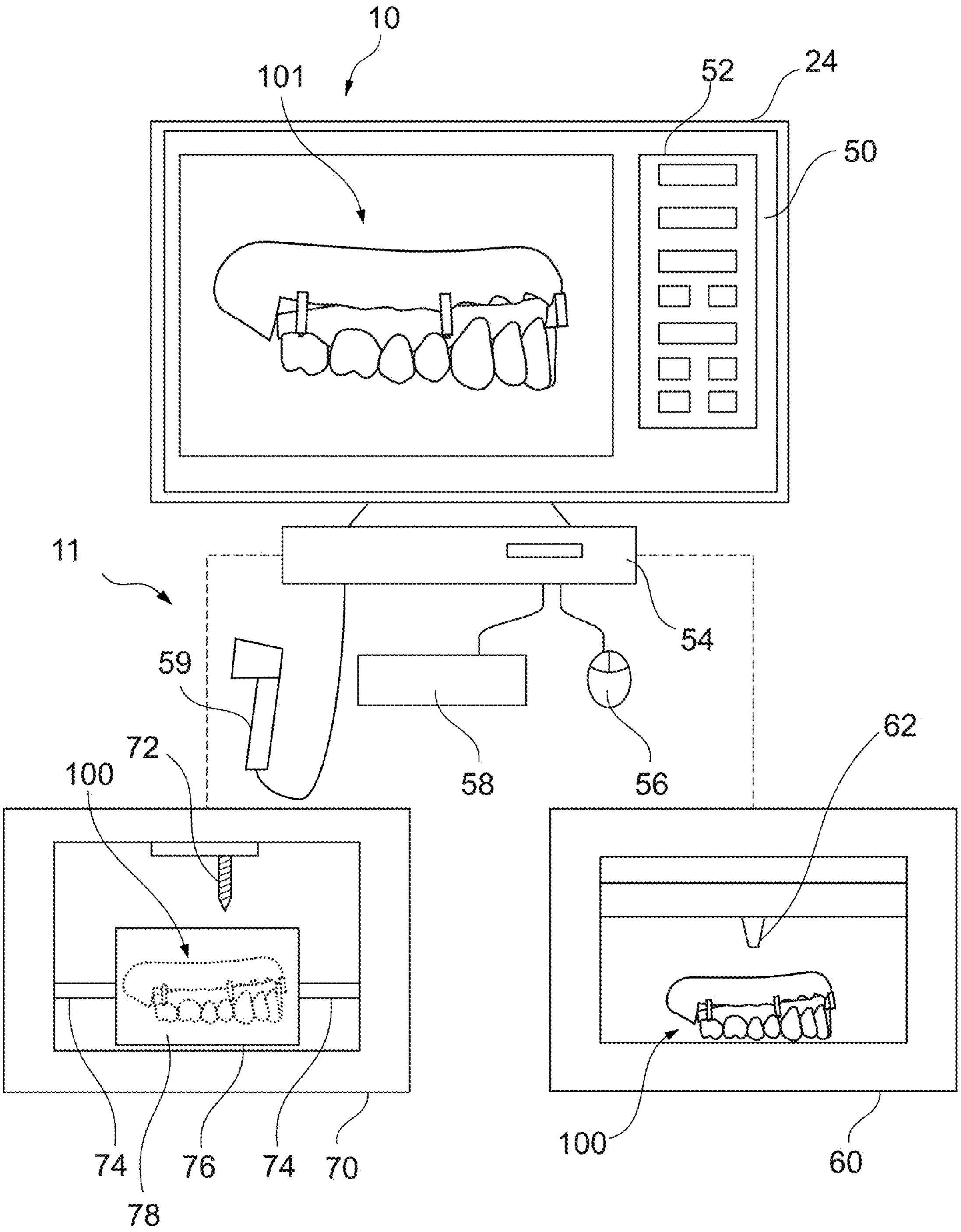
FIG. 30 shows an exemplary system for manufacturing a dental arch positioning setup.

FIG. 30 shows an exemplary manufacturing system 11 for manufacturing one or more dental arch positioning setups and/or a bite index. For the manufacturing, manufacturing data may be provided comprising three-dimensional digital models of the elements to be manufactured, like the one or more dental arch positioning setups and/or the bite index. For example, a three-dimensional digital model 101 of a dental arch positioning setup 100 may be provided. This three-dimensional digital model 102 may, e.g., be used as a template for manufacturing the dental arch positioning setup 100 as a physical copy of the template.

The manufacturing system 11 may comprise the computing device 10 of FIG. 28. The computing device 10 may further be configured to control one or more manufacturing devices 60, 70. For example, the manufacturing system 11 may comprise a manufacturing device in form of a machining device 70 controlled by the computing device 10. The machining device 70 may be configured to machining a blank 76 using one or more machining tools 72. The blank 76 of raw material 78, may be provided using a holding device 74 and cut into a desired shape and size of the element to be manufactured, e.g., the dental arch positioning setup 100. The machining tool 72 may, e.g., be a milling tool.

For example, the manufacturing system 11 may comprise a manufacturing device in form of a 3D printing device 60. The 3D printing device 60 may be controlled by the computing device 10 and configured to print an element to be manufactured, e.g., the dental arch positioning setup 100. The 3D printing device 60 may comprise a printing element 62 configured to print the respective element, like the dental arch positioning setup 100, layer by layer. The printing element 62 may, e.g., comprise a nozzle configured for distributing printing material.

For example, the three-dimensional digital model of the element to be manufactured may be used as a positive to define a negative of the element to be manufactured in form of a negative three-dimensional digital model. For example, the three-dimensional digital model 101 may be used as a positive to define a negative of the dental arch positioning setup 100 in form of a negative three-dimensional digital model. The negative 3D digital restoration model may be used to manufacture, e.g., using machining device 70 or 3D printing device 60, a casting matrix. The casting matrix may be configured for casting the element to be manufactured by inserting casting material into the casting matrix and curing the inserted casting material.

For example, the dental arch positioning setup comprising the full dental arch with the gingiva section and the support base may be one structure forming a single body. For example, the dental arch positioning setup may be manufactured as one single body. For example, the dental arch positioning setup comprising the full dental arch with the gingiva section and the support base may be monochromatic. For example, the full dental arch with the gingiva section may be one structure forming a single body. For example, the full dental arch with the gingiva section may be manufactured as one single body. For example, the full dental arch with the gingiva section may be monochromatic.

For example, the dental arch positioning setup comprising the full dental arch with the gingiva section and the support base may be provided in form of a plurality of structures forming a plurality of bodies, which are bonded together for forming the final dental arch positioning setup. For example, the dental arch positioning setup may be manufactured in form of a plurality of bodies, which are bonded together for forming the final dental arch positioning setup. For example, the dental arch positioning setup may have different colors. For example, the gingiva section may be gingiva-colored or gum-colored, while the full dental arch, i.e., a tooth section, may be tooth-colored. For example, the support base may be gingiva-colored or gum-colored as well. For example, the gingiva section and the support base may be one structure forming a single body. For example, the gingiva section and the support base may be manufactured as one single body. For example, the full dental arch and the gingiva section may be two or more structures forming two or more bodies, which are bonded to each other using a bonding agent. For example, the full dental arch and the gingiva section may be two structures forming two bodies, which are bonded to each other. For example, the full dental arch and the gingiva section may be manufactured in form of a plurality of bodies, which are bonded together for forming the final full dental arch and the gingiva section. For example, the full dental arch and the gingiva section may have different colors. For example, the gingiva section may be gingiva-colored or gum-colored, while the full dental arch, i.e., a tooth section, may be tooth-colored.

While the invention has been illustrated and described in detail in the drawings and foregoing description, such illustration and description are to be considered illustrative or exemplary and not restrictive; the invention is not limited to the disclosed embodiments.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

A single processor or other unit may fulfill the functions of several items recited in the claims. A computer program may be stored/distributed on a suitable medium, such as an optical storage medium or a solid-state medium supplied together with or as part of other hardware, but may also be distributed in other forms, such as via the Internet or other wired or wireless telecommunication systems.

As will be appreciated by one skilled in the art, aspects of the present invention may be embodied as an apparatus, method, computer program or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer executable code embodied thereon. A computer program comprises the computer executable code or "program instructions".

Any combination of one or more computer readable medium(s) may be utilized. The computer readable medium may be a computer readable signal medium or a computer readable storage medium, A "computer-readable storage medium" as used herein encompasses any tangible storage medium which may store instructions which are executable by a processor of a computing device. The computer-readable storage medium may be referred to as a computer-readable non-transitory storage medium. The computer-readable storage medium may also be referred to as a tangible computer readable medium. For example, a computer-readable storage medium may also be able to store data which is able to be accessed by the processor of the computing device. Examples of computer-readable storage media include, but are not limited to: a floppy disk, a magnetic hard disk drive, a solid-state hard disk, flash memory, a USB thumb drive, Random Access Memory (RAM), Read Only Memory (ROM), an optical disk, a magneto-optical disk, and the register file of the processor. Examples of optical disks include Compact Disks (CD) and Digital Versatile Disks (DVD), for example CD-ROM, CD-RW, CD-R, DVD-ROM, DVD-RW, or DVD-R disks. A further example of an optical disk may be a Blu-ray disk. The term computer readable-storage medium also refers to various types of recording media capable of being accessed by the computing device via a network or communication link. For example, a data may be retrieved over a modem, over the internet, or over a local area network. Computer executable code embodied on a computer readable medium may be transmitted using any appropriate medium, including but not limited to wireless, wireline, optical fiber cable, RF, etc., or any suitable combination of the foregoing.

A computer readable signal medium may include a propagated data signal with computer executable code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

"Computer memory" or "memory" is an example of a computer-readable storage medium. Computer memory is any memory which is directly accessible to a processor. "Computer storage" or "storage" is a further example of a computer-readable storage medium. Computer storage is any non-volatile computer-readable storage medium. For example, computer storage may also be computer memory or vice versa.

A "processor" as used herein encompasses an electronic component which is able to execute a program or machine executable instruction or computer executable code. References to the computing device comprising "a processor" should be interpreted as possibly containing more than one processor or processing core. The processor may for instance be a multi-core processor. A processor may also refer to a collection of processors within a single computing device or distributed amongst multiple computing devices. The term computing device should also be interpreted to possibly refer to a collection or network of computing devices each comprising a processor or processors. The computer executable code may be executed by multiple processors that may be within the same computing device or which may even be distributed across multiple computing devices.

Computer executable code may comprise machine executable instructions or a program which causes a processor to perform an aspect of the present invention. Computer executable code for carrying out operations for aspects of the present invention may be written in any combination of one or more programming languages, including an object-oriented programming language such as Java, Smalltalk, C++ or the like and conventional procedural programming languages, such as the "C" programming language or similar programming languages and compiled into machine executable instructions. In some instances, the computer executable code may be in the form of a high-level language or in a pre-compiled form and be used in conjunction with an interpreter which generates the machine executable instructions on the fly.

The computer executable code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Generally, the program instructions can be executed on one processor or on several processors. In the case of multiple processors, they can be distributed over several different entities like clients, servers etc. Each processor could execute a portion of the instructions intended for that entity. Thus, when referring to a system or process involving multiple entities, the computer program or program instructions are understood to be adapted to be executed by a processor associated or related to the respective entity.

A "user interface" as used herein is an interface which allows a user or operator to interact with a computer or computing device. A 'user interface' may also be referred to as a 'human interface device.' A user interface may provide information or data to the operator and/or receive information or data from the operator. A user interface may enable input from an operator to be received by the computer and may provide output to the user from the computer. In other words, the user interface may allow an operator to control or manipulate a computer and the interface may allow the computer to indicate the effects of the operator's control or manipulation. The display of data or information on a display or a graphical user interface is an example of providing information to an operator. The receiving of data through a keyboard, mouse, trackball, touchpad, pointing stick, graphics tablet, joystick, gamepad, webcam, headset, gear sticks, steering wheel, pedals, wired glove, dance pad, remote control, one or more switches, one or more buttons, and accelerometer are all examples of user interface components which enable the receiving of information or data from an operator.

A GUI element is a data object some of which's attributes specify the shape, layout and/or behavior of an area displayed on a graphical user interface, e.g., a screen. A GUI element can be a standard GUI element such as a button, a text box, a tab, an icon, a text field, a pane, a check-box item or item group or the like. A GUI element can likewise be an image, an alphanumeric character or any combination thereof. At least some of the properties of the displayed GUI elements depend on the data value aggregated on the group of data object said GUI element represents.

Aspects of the present invention are described with reference to flowchart illustrations and/or block diagrams of methods, apparatus (systems) and computer program products. It will be understood that each block or a portion of the blocks of the flowchart, illustrations, and/or block diagrams, can be implemented by computer program instructions in form of computer executable code when applicable. It is further understood that, when not mutually exclusive, combinations of blocks in different flowcharts, illustrations, and/or block diagrams may be combined. These computer program instructions may be provided to a processor of a general-purpose computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Although the invention has been described in reference to specific embodiments, it should be understood that the invention is not limited to these examples only and that many variations of these embodiments may be readily envisioned by the skilled person after having read the present disclosure. The invention may thus further be described without limitation and by way of example only by the following embodiments. The following embodiments may contain preferred embodiments. Accordingly, the term "feature combination" as used therein may refer to such a "preferred embodiment".

1. A dental arch positioning setup comprising a full dental arch with a gingiva section and a support base,
   - the support base being configured to support and position the full dental arch with the gingiva section on a patient's edentulous first jaw,
   - an occlusal surface of the support base comprising a cutout for the full dental arch with the gingiva section, the cutout having a cross-section larger than a cross-section of the full dental arch with the gingiva section,
   - a plurality of connecting elements connecting the full dental arch and gingiva section with the support base, the plurality of connecting elements holding the full dental arch with the gingiva section in position over the cutout,
   - the full dental arch comprising a plurality of through-holes extending through the full dental arch with the gingiva section, the through-holes being configured to receive abutments for attaching the full dental arch with the gingiva section to implants.

2. The dental arch positioning setup of feature combination 1, the dental arch positioning setup further comprising the abutments.

3. The dental arch positioning setup of feature combination 2, the abutments being bonded to the full dental arch with a first bonding agent arranged within the through-holes of the full dental arch.

4. The dental arch positioning setup of feature combination 2 or 3, the cutout providing a clearance between the gingiva section and the support base bridged by the connecting elements, the clearance providing access to gingival ends of the through-holes of the full dental arch.

5. The dental arch positioning setup of feature combination 4, the clearance extending along one or more of the following sides of the dental arch positioning setup: along a vestibular side providing access to the gingival ends of the through-holes of the full dental arch from the vestibular side, along an oral side providing access to the gingival ends of the through-holes of the full dental arch from the oral side.

6. The dental arch positioning setup of feature combination 5, the clearance extending circumferentially around the full dental arch with the gingiva section.

7. The dental arch positioning setup of any of the previous feature combinations, the connecting elements being provided in form of connecting pins.

8. The dental arch positioning setup of any of the previous feature combinations, the connecting elements comprising pre-determined breaking sections configured to enable a detaching of the full dental arch with the gingiva section from the support base by a breaking of the connecting elements at the pre-determined breaking sections.

9. The dental arch positioning setup of feature combination 8, the pre-determined breaking sections being provided by end sections of the connecting elements, the end sections being connected to the gingiva section and tapering towards the gingiva section.

10. The dental arch positioning setup of feature combination 9, the end sections having conical forms.

11. The dental arch positioning setup of any of the previous feature combinations, the full dental arch with the gingiva section being provided in a two-part form comprising a vestibular part and an oral part, the vestibular part comprising a vestibular tooth subpart and a vestibular gingiva subpart, the oral part comprising an oral tooth subpart and an oral gingiva subpart.

12. The dental arch positioning setup of feature combination 11, the vestibular part and the oral part of the full dental arch with the gingiva section being bonded to each other by a second bonding agent.

13. The dental arch positioning setup of any of feature combinations 11 to 12, wherein only the vestibular part of the full dental arch with the gingiva section is connected to the support base via the connecting elements.

14. An assembly comprising the dental arch positioning setup of any of the previous feature combinations and a bite index, the bite index comprising a reception section with a reception for receiving the full dental arch of the dental arch positioning setup and one or more spacing elements configured to establish a pre-defined spacing between the dental arch positioning setup and the patient's second jaw.

15. The assembly of feature combination 14, the spacing elements being arranged on an occlusal surface of the bite index.

16. The assembly of any of feature combinations 14 to 15, the one or more spacing elements comprising one or more pillars.

17. The assembly of any of feature combinations 14 to 16, the occlusal surface of the reception section of the bite index comprising one or more cutouts configured for providing access to the plurality of through-holes comprised by the full dental arch, when the full dental arch is arranged within the reception of the reception section.

18. The assembly of any of feature combinations 14 to 17, the assembly further comprising a second dental arch positioning setup for the patient's second jaw, the bite index further comprising a second reception section with a second reception for receiving a second full dental arch of the second dental arch positioning setup, the spacing elements of the bite index connecting the two reception sections of the bite index with each.

19. A computer program product comprising a non-transitory computer readable storage medium comprising manufacturing data embodied therewith, the manufacturing data defining a first three-dimensional digital model of a dental arch positioning setup as a first template for manufacturing the dental arch positioning setup, the dental arch positioning setup comprising a full dental arch with a gingiva section and a support base, the support base being configured to support and position the full dental arch with the gingiva section on a patient's edentulous first jaw, an occlusal surface of the support base comprising a cutout for the full dental arch with the gingiva section, the cutout having a cross-section larger than a cross-section of the full dental arch with the gingiva section, a plurality of connecting elements connecting the full dental arch and gingiva section with the support base, the plurality of connecting elements holding the full dental arch with the gingiva section in position over the cutout, the full dental arch comprising a plurality of through-holes extending through the full dental arch with the gingiva section, the through-holes being configured to receive abutments for attaching the full dental arch with the gingiva section to implants.

20. The computer program product of feature combination 19, the manufacturing data further defining a second three-dimensional digital model of a bite index as a second template for manufacturing the bite index, the bite index comprising a reception section with a reception for receiving the full dental arch of the dental arch positioning setup and one or more spacing elements configured to establish a pre-defined spacing between the dental arch positioning setup and the patient's second jaw, when dental arch positioning setup is arranged on the patient's edentulous first jaw.

21. A computing device comprising a processing unit and a memory storing program instructions executable by the processing unit, the memory further storing manufacturing data defining a first three-dimensional digital model of a dental arch positioning setup as a first template for manufacturing the dental arch positioning setup, the dental arch positioning setup comprising a full dental arch with a gingiva section and a support base, the support base being configured to support and position the full dental arch with the gingiva section on a patient's edentulous first jaw, an occlusal surface of the support base comprising a cutout for the full dental arch with the gingiva section, the cutout having a cross-section larger than a cross-section of the full dental arch with the gingiva section, a plurality of connecting elements connecting the full dental arch and gingiva section with the support base, the plurality of connecting elements holding the full dental arch with the gingiva section in position over the cutout, the full dental arch comprising a plurality of through-holes extending through the full dental arch with the gingiva section, the through-holes being configured to receive abutments for attaching the full dental arch with the gingiva section to implants, execution of the program instructions by the processing unit causing the computing device to provide the manufacturing data for a manufacturing of the dental arch positioning setup using the first three-dimensional digital model of the dental arch positioning setup as the first template for the manufacturing.

22. The computing device of feature combination 21, the manufacturing data further defining a second three-dimensional digital model of a bite index as a second template for manufacturing the bite index, the bite index comprising a reception section with a reception for receiving the full dental arch of the dental arch positioning setup and one or more spacing elements configured to establish a pre-defined spacing between the dental arch positioning setup and the patient's second jaw, when dental arch positioning setup is arranged on the patient's edentulous first jaw, execution of the program instructions by the processing unit further causing the computing device to provide the manufacturing data for a manufacturing of the bite index using the second three-dimensional digital model of the bite index as the second template for the manufacturing.

23. A manufacturing system comprising the computing device of any feature combinations 21 to 22, the manufacturing system further comprising one or more manufacturing devices configured to manufacture the dental arch positioning setup, execution of the program instructions by the processing unit further causing the computing device to control the one or more manufacturing devices to manufacture the dental arch positioning setup using the first three-dimensional digital model of the dental arch positioning setup provided by the manufacturing data as the first template for the manufacturing.

24. The manufacturing system of feature combination 23, the one or more manufacturing devices further being configured to manufacture the bite index, execution of the program instructions by the processing unit further causing the computing device to control the one or more manufacturing devices to manufacture the bite index using the second three-dimensional digital model of the bite index provided by the manufacturing data as the second template for the manufacturing.

REFERENCE SIGNS LIST

10 computing device
11 manufacturing system
12 external device
16 processing unit
18 bus
20 network adapter
22 I/O interface
24 display
28 memory
30 RAM
32 cache
34 storage system

40 program
42 program module
50 user interface
52 control elements
54 hardware device
56 keyboard
58 mouse
59 scanner
60 3D printing device
62 printing element
70 machining device
72 machining tool
74 holding device
76 blank
78 raw material
100 dental arch positioning setup
101 three-dimensional digital model
104 artificial tooth
106 gingiva section
108 through-hole
110 abutment
112 bonding agent
120 support base
122 occlusal surface
124 cutout
126 clearance between the gingiva section and the support base
128 connecting element
130 pre-determined breaking section
132 end section
140 vestibular part
142 vestibular tooth subpart
143 vestibular tooth element
144 vestibular gingiva subpart
150 oral part
152 oral tooth subpart
153 oral tooth element
154 oral gingiva subpart
160 first jaw
162 second jaw
170 bite index
172 reception section
174 occlusal surface
176 spacing element
177 clearance between spacing elements
178 cutout
180 assembly

The invention claimed is:

1. An assembly comprising a dental arch positioning setup and a bite index, the dental arch positioning setup comprising a full dental arch with a gingiva section and a support base, the support base being configured to support and position the full dental arch with the gingiva section on a patient's edentulous first jaw, an occlusal surface of the support base comprising a cutout for the full dental arch with the gingiva section, the cutout having a cross-section larger than a cross-section of the full dental arch with the gingiva section, a plurality of connecting elements connecting the full dental arch and gingiva section with the support base, the plurality of connecting elements holding the full dental arch with the gingiva section in position over the cutout, the full dental arch comprising a plurality of through-holes extending through the full dental arch with the gingiva section, the through-holes being configured to receive abutments for attaching the full dental arch with the gingiva section to implants, the bite index comprising a reception section with a reception for receiving the full dental arch of the dental arch positioning setup and one or more spacing elements configured to establish a pre-defined spacing between the dental arch positioning setup and the patient's second jaw, the bite index being configured for arranging the dental arch positioning setup on the first jaw at a predefined position relative to the second jaw, when the patient bites on the dental arch positioning setup arranged within the bite index, the bite index being configured for allowing access to the patient's oral cavity, when the patient bites on the dental arch positioning setup arranged within the bite index.

2. The assembly of claim 1, the dental arch positioning setup further comprising the abutments.

3. The assembly of claim 2, the abutments being bonded to the full dental arch with a first bonding agent arranged within the through-holes of the full dental arch.

4. The assembly of claim 2, the cutout providing a clearance between the gingiva section and the support base bridged by the connecting elements, the clearance providing access to gingival ends of the through-holes of the full dental arch.

5. The assembly of claim 4, the clearance extending along one or more of the following sides of the dental arch positioning setup: along a vestibular side providing access to the gingival ends of the through-holes of the full dental arch from the vestibular side, along an oral side providing access to the gingival ends of the through-holes of the full dental arch from the oral side.

6. The assembly of claim 5, the clearance extending circumferentially around the full dental arch with the gingiva section.

7. The assembly of claim 1, the connecting elements being provided in form of connecting pins.

8. The assembly of claim 1, the connecting elements comprising pre-determined breaking sections configured to enable a detaching of the full dental arch with the gingiva section from the support base by a breaking of the connecting elements at the pre-determined breaking sections.

9. The assembly of claim 8, the pre-determined breaking sections being provided by end sections of the connecting elements, the end sections being connected to the gingiva section and tapering towards the gingiva section.

10. The assembly of claim 9, the end sections having conical forms.

11. The assembly of claim 1, the full dental arch with the gingiva section being provided in a two-part form comprising a vestibular part and an oral part, the vestibular part comprising a vestibular tooth subpart and a vestibular gingiva subpart, the oral part comprising an oral tooth subpart and an oral gingiva subpart.

12. The assembly of claim 11, the vestibular part and the oral part of the full dental arch with the gingiva section being bonded to each other by a second bonding agent.

13. The assembly of claim 11, wherein only the vestibular part of the full dental arch with the gingiva section is connected to the support base via the connecting elements.

14. The assembly of claim 1, the one or more spacing elements being arranged on an occlusal surface of the bite index.

15. The assembly of claim 1, the one or more spacing elements comprising one or more pillars.

16. The assembly of claim 1, an occlusal surface of the reception section of the bite index comprising one or more cutouts configured for providing access to the plurality of through-holes comprised by the full dental arch, when the full dental arch is arranged within the reception of the reception section.

17. The assembly of claim 1, the assembly further comprising a second dental arch positioning setup for the patient's second jaw, the bite index further comprising a second reception section with a second reception for receiving a second full dental arch of the second dental arch positioning setup, the spacing elements of the bite index connecting the two reception sections of the bite index with each.

18. A computing device comprising a processing unit and a memory storing program instructions executable by the processing unit, the memory further storing manufacturing data defining a three-dimensional digital model of the dental arch positioning setup of the assembly of claim 1 as a template for manufacturing the dental arch positioning setup, which, when executed by a computing device, causes the computing device to manufacture the dental arch positioning setup.

* * * * *